United States Patent
Roberts et al.

(10) Patent No.: US 6,295,551 B1
(45) Date of Patent: Sep. 25, 2001

(54) CALL CENTER SYSTEM WHERE USERS AND REPRESENTATIVES CONDUCT SIMULTANEOUS VOICE AND JOINT BROWSING SESSIONS

(75) Inventors: Pasha Roberts, Belmont; Firdaus Bhathena, Cambridge, both of MA (US); Francis A. Honoré, Houston, TX (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 08/852,764

(22) Filed: May 7, 1997

Related U.S. Application Data

(60) Provisional application No. 60/017,027, filed on May 7, 1996.

(51) Int. Cl.[7] .................................................. G06F 15/16

(52) U.S. Cl. ........................ 709/205; 709/203; 709/217

(58) Field of Search ........................ 395/200.47–200.49, 395/200.34–200.35, 200.38, 308–309, 265–267; 709/217–219, 204–205, 208, 203

(56) References Cited

U.S. PATENT DOCUMENTS

| 4,653,090 | 3/1987 | Hayden ................................. 379/204 |
| 4,723,238 | 2/1988 | Isreal et al. ............................. 370/60 |
| 4,809,272 | 2/1989 | Torgrim et al. ..................... 370/110.3 |

(List continued on next page.)

FOREIGN PATENT DOCUMENTS

| 2178705 | 3/1997 | (CA) . |
| 0 709 997 | 5/1996 | (EP) . |
| WO 97/12448 | 4/1997 | (WO) . |
| WO 97/28635 | 8/1997 | (WO) . |

OTHER PUBLICATIONS

Frivold, T., et al., "Extending WWW for Synchronous Collaboration", http://www.ncsa.uic.edu/SDG/IT94/Proceedings/CSCW/frivold/frivold.html, pp. 1–8, Sep. 1994.*

Woo, T., et al., "A Synchronous Collaboration Tool for World–Wide Web," http://www.ncsa.uic.edu/SDG/IT94/Proceedings/CSCW/rees/SynColTol.html, pp. 1–10, Oct. 1994.*

(List continued on next page.)

Primary Examiner—Zarni Maung
Assistant Examiner—Andrew Caldwell
(74) Attorney, Agent, or Firm—Chapin & Huang, L.L.C.; Barry W. Chapin

(57) ABSTRACT

A call center system allows a representative and a user to jointly browse World Wide Web content while simultaneously conducting a voice conversation over either a circuit switched or packet switched network. A user may initiate a joint browsing, or synchronous collaboration, session by accessing a web page associated with the call center. A call center server downloads a user applet to the user's computer. The user applet communicates state information about the user computer's browser display, or user view, to the server. The server stores this state information. The server then downloads a service applet to the browser of a selected call center representative. The service applet generates a service view including a representation of the user view and a script frame that controls the representation of the user view. The representative may, for example, alter the representation of the user view by selecting a hyperlink or entering information into an HTML form. The service applet communicates these alterations to the server. The user applet periodically polls the server to detect the representatives alterations to the representation of the user view and updates the user view accordingly. In a similar manner, the user applet conveys to the server the user's alterations to the user view so the representative computer's representation of the user view may be updated. Although only the single user and representative case is described here, multiple users and multiple representatives may conduct a single conference.

35 Claims, 8 Drawing Sheets

U.S. PATENT DOCUMENTS

| | | | |
|---|---|---|---|
| 4,837,798 | | 6/1989 | Cohen et al. ............................ 379/88 |
| 4,866,758 | | 9/1989 | Heinzelmann ........................... 379/94 |
| 5,029,200 | | 7/1991 | Hass et al. ............................... 379/89 |
| 5,062,103 | | 10/1991 | Davidson et al. .................... 370/58.1 |
| 5,097,528 | | 3/1992 | Gursahaney et al. ................... 379/67 |
| 5,181,236 | | 1/1993 | LaVallee et al. ........................ 379/67 |
| 5,206,903 | | 4/1993 | Kohler et al. .......................... 379/309 |
| 5,293,619 | | 3/1994 | Dean ...................................... 395/650 |
| 5,333,266 | | 7/1994 | Boaz et al. ............................. 395/200 |
| 5,341,477 | | 8/1994 | Pitkin et al. ........................... 395/200 |
| 5,392,400 | * | 2/1995 | Berkowitz et al. .............. 395/200.33 |
| 5,440,699 | | 8/1995 | Farrand et al. ........................ 395/155 |
| 5,448,626 | | 9/1995 | Kajiya et al. ............................ 379/67 |
| 5,530,795 | | 6/1996 | Wan ....................................... 395/153 |
| 5,537,548 | * | 7/1996 | Fin et al. ............................... 709/204 |
| 5,563,805 | * | 10/1996 | Arabuckle et al. .............. 395/200.34 |
| 5,572,643 | | 11/1996 | Judson ................................... 395/793 |
| 5,583,993 | | 12/1996 | Foster et al. ...................... 395/200.04 |
| 5,583,996 | | 12/1996 | Tsuchiya .......................... 395/200.15 |
| 5,608,426 | | 3/1997 | Hester ................................... 345/153 |
| 5,608,446 | | 3/1997 | Carr et al. ................................. 348/6 |
| 5,608,872 | | 3/1997 | Schwartz et al. ............... 395/200.04 |
| 5,623,603 | | 4/1997 | Jiang et al. ...................... 395/200.04 |
| 5,634,018 | | 5/1997 | Tanikoshi et al. .................... 395/329 |
| 5,649,104 | | 7/1997 | Carleton et al. ................. 395/200.04 |
| 5,706,502 | | 1/1998 | Foley et al. ........................... 395/610 |
| 5,742,778 | * | 4/1998 | Hao et al. .............................. 345/332 |
| 5,754,830 | * | 5/1998 | Butts et al. ............................ 395/500 |
| 5,765,152 | | 6/1998 | Erickson ................................... 707/9 |
| 5,768,510 | * | 6/1998 | Gish ................................. 395/200.33 |
| 5,778,368 | | 7/1998 | Hogan et al. .......................... 707/10 |
| 5,781,909 | | 7/1998 | Logan et al. .......................... 707/200 |
| 5,802,526 | * | 9/1998 | Fawcett et al. ....................... 707/104 |
| 5,809,247 | | 9/1998 | Richardson et al. ............ 395/200.48 |
| 5,815,683 | * | 9/1998 | Vogler ................................... 395/500 |
| 5,828,839 | * | 10/1998 | Moncreiff ............................. 709/204 |
| 5,844,553 | * | 12/1998 | Hao et al. .............................. 345/329 |
| 5,861,883 | * | 1/1999 | Cuomo et al. ........................ 345/326 |
| 5,862,330 | * | 1/1999 | Anupam et al. ...................... 709/204 |
| 5,884,032 | * | 3/1999 | Bateman et al. ...................... 709/204 |
| 5,907,547 | * | 5/1999 | Foladare et al. ...................... 370/352 |
| 5,941,957 | * | 8/1999 | Ingrassia, Jr. et al. ............... 709/248 |
| 5,944,791 | | 8/1999 | Scherpbier ............................ 709/218 |
| 5,956,027 | * | 9/1999 | Krishnamurthy ..................... 345/329 |
| 5,958,014 | * | 9/1999 | Cave ...................................... 709/229 |
| 5,974,446 | * | 10/1999 | Sonnenreich et al. ............... 709/204 |
| 5,991,382 | | 11/1999 | Bayless et al. ........................ 379/136 |
| 5,991,394 | | 11/1999 | Dezonno et al. ..................... 379/265 |
| 6,031,836 | * | 2/2000 | Haserodt ............................... 370/389 |
| 6,046,762 | * | 4/2000 | Sonesh et al. .......................... 348/16 |
| 6,064,730 | * | 5/2000 | Ginsberg .............................. 379/265 |
| 6,070,185 | * | 5/2000 | Anupam et al. ...................... 709/204 |
| 6,108,687 | * | 8/2000 | Craig ..................................... 709/203 |
| 6,134,318 | * | 10/2000 | O'Neil .................................. 379/266 |
| 6,151,621 | * | 11/2000 | Colyer et al. ......................... 709/204 |
| 6,151,622 | * | 11/2000 | Fraenkel et al. ...................... 709/205 |
| 6,181,689 | * | 1/2001 | Choung et al. ....................... 370/352 |
| 6,199,096 | * | 3/2001 | Mirashrafi et al. ................... 709/202 |
| 6,212,192 | * | 4/2001 | Mirashrafi et al. ................... 370/401 |

OTHER PUBLICATIONS

Krishnamurthy, B., et al., "Yeast: A General Purpose Event–Action System," IEEE Trans. on Software Engineering, vol. 21, No. 10, pp. 845–857, Oct. 1995.*

Gralla, P., "How Intranets Work," Ziff–Davis Press, pp. 42–45, 1996.*

Stanek, W., "Web Publishing Unleashed," Sams.net Publishing pp. 342–343, 1996.*

Frivold, T.J. et al., "Extending WWW For Synchronous Collaboration," Computer Networks and ISDN Systems, vol. 28, No. 1/02, Dec. 1995, pp. 69–75.

Jacobs, S. et al., "Filing HTML forms simultaneously: CoWeb—architecture and functionality," Computer Networks and ISND Systems, vol. 28, No. 11, May 1996, pp. 1385–1395.

Low, C. et al., "WeblN—An Architecture For Fast Deployment of In–Based Personal Services," Workshop Record, Intelligent Network. Freedom and Flexibility: Realising The Promise of Intelligent Network Services, Apr. 21, 1996, pp. 1–12.

* cited by examiner

CALL CENTER SYSTEM WHERE USERS AND REPRESENTATIVES CONDUCT SIMULTANEOUS VOICE AND JOINT BROWSING SESSIONS

This application claims the benefit of Provisional Application No. 60/017,027 filed May 7, 1996.

BACKGROUND OF THE INVENTION

The present invention relates generally to an apparatus and method for coordinating Internet communication between two users. More particularly, the invention relates to an apparatus and method for coordinating Internet multi-media communication such that the two users can view and modify a copy of the same multi-media content, where any modifications made by one user are subsequently viewed by a second user, as well as enhancing the communication by supplementing any visual communication with audio communication.

Businesses commonly service customers through call centers staffed with technical support personnel, sales support personnel, or service personnel (hereinafter collectively referred to as sales representative) that can answer the customer's questions. Typically, these centers use an automated call distributor ("ACD") system to handle incoming calls from the telephone network. Commercially available ACD systems provide call processing, voice processing, data processing and network capabilities for the call centers. The ACD system usually routes customer calls to a sales representative. The sales representative typically uses a headset and a user device connected to the ACD system to respond to the incoming calls. The ACD system can route the calls to queues, which can be customized to reflect how a business wants to prioritize and route incoming calls.

While the customer is on-hold, the ACD system also provides the customer with information. Typically, the ACD system will notify the customer that the customer's call is important, "please hold", suggest that the customer call back during non-peak hours, or inform the customer the time the customer can expect to be on-hold, for example. In such an implementation, the customer has to wait on the telephone while listening to the repeated messages of the ACD system. This can frustrate the customer. It also restricts the customer from performing many other tasks while the customer is waiting on the phone for the sales representative or technical specialist. In some implementations, the ACD systems pipe advertising to the customer while the customer is on-hold. The customer, however, may not be interested in the products or services that are being advertised, and may have further frustration from being subjected to the advertisements. Alternatively, the ACD system can provides the customer with melodies during the on-hold period. In this implementation, however, the customer is still restricted from doing other tasks and the business looses an opportunity to advertise.

Another way businesses communicate with customers is via Internet web pages. Businesses elicit questions from customers by advertising the business's products on Internet web pages. Such web pages allow the customer requesting that a sales representative of the business contact them. To request service, the customer inserts their name and e-mail address or phone number in a space provided on the web page and activates a call-me button. Thereafter, the sales representative is sent an e-mail containing the request for service, to which the sales representative responds. However, when the sales representative responds, either by phone or e-mail, the customer is most likely no longer viewing the business's web page, and thus the business's web page cannot contribute to the sales representative's pitch. Moreover, the response is not immediate, sometimes with log times measured in days, and during the interim the customer may buy another product.

An intermediate solution to answer a customer's questions regarding products is presented by allowing the customer to use or view a demonstration of the business's product while on the Internet. By way of example, if a customer wants to buy software, the customer may go to the business's web site and request a software demonstration. The web site downloads to the customer the software demonstration. If all the customer's questions are answered by viewing the demonstration, then the customer can then purchase the software. If the customer still has unanswered questions, however, the customer will again have to either place a telephone call or wait for a delayed e-mail or call response.

A further disadvantage of providing the customer a software demonstration downloaded from the Internet is the amount of time it takes a customer to go to each web site, ascertain the product the customer wants to view, and then wait while the appropriate plug-in or code, for example, is downloaded to the customer's computer. If the customer only needs to view a part of the demonstration, downloading the entire code to a customer unnecessarily uses resources of the customer. In addition, the time the customer waits for code to be downloaded is again wasted time, just as was waiting on the phone. One solution to this problem is taught in U.S. Pat. No. 5,572,643 to Judson which claims a method for displaying information on a graphic user interface when a customer is waiting for a link to download on the Internet. However, this is akin to the making the customer listen to unwanted advertisements on the phone and, thus, still has the previously described problems.

A further disadvantage of downloading a software demonstration is that whatever is downloaded is viewed by the customer alone without the assistance of the sales representative. The software demonstrations are not usually concurrent-use software applications that can be viewed simultaneously at remote locations. Thus, the software applications cannot be viewed by both the customer and the sales representative simultaneously. Further, if they were, this would require even longer download periods. In addition, such applications would require a large amount of the customer's resources to run and be difficult for the customer to manipulate.

Accordingly, it is an object of this invention to provide an apparatus to decrease the time between a customer's request for information over the Internet and a sales representative's response, such that the customer can still access the sales representative's web site.

It is another object of this invention to provide the customer with relevant information while they are on hold, thus enhancing the usefulness of the time that the customers are on-hold waiting to speak to a sales representative.

It is another object of this invention to allow business's to advertise products to customers while they are on hold that are of interest to the customer.

It is a further object of this invention to decrease the time and resources used to download information, such that the customer only has to wait for what that individual customer requires.

It is still another object of this invention to allow customers to communicate with the sales representative regarding the application without requiring the customer to learn the specific software applications.

It is still another object of this invention to allow customers to collaborate with the sales representative without using the customers time and resources to have a complex concurrent-use program downloaded to the customer.

It is a further object of this invention to allow sales representatives to conduct business over multiple networks, such as the telephone network and the Internet.

These and other objects of the invention will be obvious and will appear hereinafter.

SUMMARY

The aforementioned and other objects are achieved by the invention which provides an apparatus for coordinating Internet communication between at least two users and a method associated therewith. The apparatus provides a visual communication across a network between a user computer and a second computer which is in communication with a server disposed between the user computer and the second computer.

The method facilitates visual communication across the network that is platform independent. As such, neither the user computer nor the second computer is restricted to using any particular operating system or software application. The only requirement of the user computer and the second computer is that it has a browser-like application for reading files. In the preferred embodiment, the browser is a hyper-text markup language ("HTML") browser.

To provide the visual communication between the user computer and the second computer, a link is established between the user computer and the server and a link is established between the server and the second computer. The server, the user computer, and the second computer can be fully distributed across the network.

In addition to being part of the link that is established, the server selectively transmits to the user computer a user applet. The user applet enables the user computer to communicate with the server. The second computer either has a service applet disposed thereon or the service applet is provided to the second computer by the server. The service applet and the user applet enable the visual communication to occur without requiring either the user computer or the second computer to have any executable files pre-installed to enable the user computer or the second computer to have a shared view. Further, the user applet and the server applet bi-directionally communicate with the server, and thus can bi-directionally communicate with each other through the server.

After the user computer has received the user applet, the user computer generates a user view. Either in parallel or thereafter, the server communicates that the link is established between the server and the user computer to the service applet. Thereafter, a session is selectively established between the user computer and the second computer.

During the session, the second computer and user computer both display on the browser of their computer, respectively, a shared view in their user interfaces. The shared view allows a user of the user computer to see a copy of the same content as is displayed on the second computer, and vise versa. Thus, both users of the user computer and second computer will be looking at the same content displayed on the browser.

The user interface of the user computer is called a user view, while the user interface of the second computer is called a service view. The service view contains a representation of the user view, the representation of the user view is the shared view.

Either the user computer or the second computer can manipulate the shared view. For example, the second computer can change the shared view from content at one universal resource locator ("URL") source location to content at a second URL source location. If the second computer implements a change to the shared view, the change is communicated to the service applet. The service applet transmits the change to the server, and the server subsequently transmits the changes to the user applet. The user applet then implements the change in the user view, and notifies the server that the change has been implemented. After the service applet receives notification from the server that the user view has changed, the service applet changes the representation of the user view in the service view, thereby conforming the shared view of the second computer to match the shared view of the user computer. This process enables the second computer to communicate to the user computer. The process can be performed bi-directionally, such that the user computer can change the user view and cause a conforming change in the second computer.

Various implementations of this method can be enabled by the user computer or the second computer. One implementation allows changes to the URL source location of the shared view. Another implementation allows changes to the images in the shared view. A further implementation of this embodiment of the invention allows the shared view to be a software application. A still further embodiment allows the shared view to display software demonstration programs.

An additional implementation of this embodiment is an interactive use of forms, where each form has objects. In this implementation, the form is represented as an array having arguments where the arguments represent the objects of the form. As the user computer or the second computer changes entries on the form, the user applet or the service applet, respectively, updates the objects in the array such that the array now represents any changes in the user interface. Then as previously described the changes are implemented in the shared view of both the user computer and the second computer.

A further implementation for the interactive use of forms supplements the forms to be event monitoring, such that when the objects on the forms change the objects notify the applets of the change. A still further implementation rewrites the objects as applets. Again, the changes to the objects are implemented in the shared view.

To enable the visual communication, the server must download the user applet to the user computer. In one embodiment of the present invention, the server enhances a resource collection function of the user's computer by only downloading to the user computer a user applet representative of the functionality the user computer needs at that time. As such, the server ascertains what the user computer needs and generates an applet representative of that functionality and downloads that applet to the user computer. If later on during the visual communication the user computer requires greater functionality, the server will then download a second user applet containing the necessary functionality. In this way, the server decreases the resource collection of the user computer in both time and space while enabling the functions of the resource that the user wishes to enable.

The user applet is further enhanced by the use of a script. The script is displayed on the user interface of the second computer, preferably adjacent to the representation of the user view. The display can be a list of scripts from which the second computer can choose or the script that the user of the second computer has selected. The script is in communication with the service applet. The script has simplified commands which it transmits to the service applet to enable the service applet to implement any changes in shared view and transmit the changes to the user applet as previously described. In the preferred embodiment the script is written in hyper-text markup language ("HTML").

The visual communication can be between more than one user computer and more than one second computer. This enables many-to-one, one-to-many, or many-to-many communication between at least one user computer and at least one second computer. Each of the more than one second computer can be identical or each of the more than one second computer can have differing service applets which are adapted to perform differing functions, such as administrative, sales, or technical support.

If the embodiment has more than one second computer, the server also has more than one queue to which it routes call requests from the user computers. A queue contains one or more call requests from the user computers. The queue is further displayed selectively on one or more second computers. The server routes call requests using various methods, such as a first-come, first-serve basis, according to attributes of the user computers, sales specialty of the second computers, or logic formulas, which may comprise formulas relate to time of call, number of call requests presently in queue, among other items. The attributes can be collected by prompting to the user computer, or the user applet can extract the attributes from the user computer.

When the call request of the user computer is placed in a queue, the server notifies the user applet regarding status of the of the queue user computer's call request. The server will display to the user computer in its user interface the status of the queue, enabling the user computer to know when his call request will likely be answered.

In one embodiment, while an entry of the user computer is in the queue, the server through the user applet displays supplemental information which is analogous to MUZAK, a trademark of Muzak, Inc., on the user computer until the user computer's call request is answered. In one embodiment, the computer supplemental information is selectively transmitted from the server based upon the attributes of the user computer. In another embodiment, the server transmits the computer supplemental information based upon scripts. While the user computer is displaying the computer supplemental information, the user computer also has a control view generated by the user applet that enables the user computer options such as disconnect or call me later, among other options.

In still another embodiment, the visual communication across the network is married to audio communication between the user computer and the second computer. In one implementation of this embodiment, both the user computer and the second computer have a voice-over net capability that is enabled during the session between user computer and second computer. In another embodiment, a traditional telephony system is used to implement the audio communication during the session. In this embodiment one audio device will be associated with at least one second computer and at least one user computer. The audio device can either initiate the communication or be used after the initiation of the visual communication between the user computer and the second computer. As such, the users of the user computer and the second computer can view shared content over the network as well as audibly communicate.

In the implementation where the audio communication is established first, the second computer directs the user computer to an appropriate address, or URL source location, whereupon the user computer is linked to the server and provides a user applet as previously described. In this embodiment, the user computer can also selectively be provided a password to enter the call session, thus enabling the call session to be private.

In still another embodiment, the second computer can be a component of a call center where the call center has an automated call distribution system ("ACD"). In this embodiment, the ACD also has a call queue. The call queue can be communicated to the server via the network if the ACD is also connected to the network, and as such the call queue of the ACD can work in tandem with or complement queue of the server. In this embodiment, the call center can utilize any additional capabilities of the ACD while supplementing the ACD with visual communication enabled by the server, the user applet, and the service applet.

In another embodiment, the communication between the server and the user computer can be conducted through a firewall using tunneling.

In further aspects, the invention provides methods in accord with the apparatus described above. The aforementioned and other aspects of the invention are evident in the drawings and in the description that follows.

DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a variety of networks and may be embodied in several different forms, it is advantageously employed in connection with the Internet. Although this is the form of the preferred embodiment and will be described as such, this embodiment should be considered illustrated and not restricted.

Figure 1:
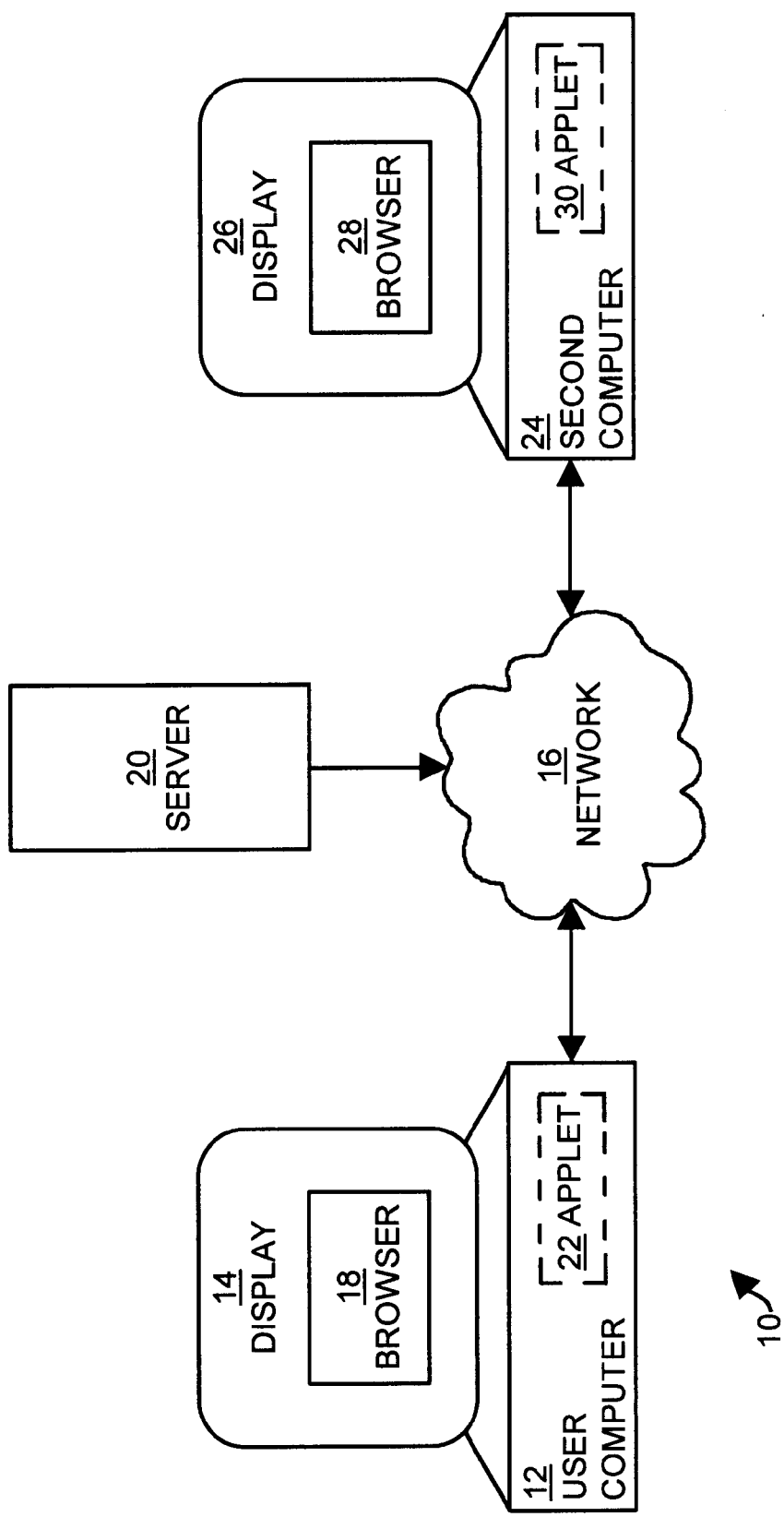
FIG. 1 shows a system diagram of one embodiment of this invention.

FIG. 1 shows a system 10 according to one embodiment of the present invention. As shown, the system 10 includes a user computer 12 in communication with a network 16 and a second computer 24 in communication with the network 16. The system 10 further comprises a server 20 interposed between the user computer 12 and the second computer 24 also in communication with the network 16.

In the preferred embodiment, network 16 is the Internet. As such, communication there over is via Transfer Control Protocol/Internet Protocol ("TCP\IP"). It should be obvious to those skilled in the art, however, that network 16 could be an intranet or any network capable of supporting communication protocols.

Similarly, the system 10 can be partially distributed, as opposed to the fully distributed depiction of FIG. 1. For instance, the server 20 and the second computer 24 could be connected to a local area network ("LAN") or a wide area network ("WAN") which, in turn, is connected to network 16.

The user computer 24 and the second computer 24 can be a personal computer, workstation, terminal, laptop or any device capable of displaying a user interface and storing an applet. The user computer 12 and the second computer 24, however, must have a browser 18, 28, respectively, where a browser shall be defined herein as any application software or firmware that can interpret files to create a view thereon, the files include for example, HTML, Javascript. An example of such browser includes, for example, any common Internet browser, inter alia, and a Java workstation, inter alia. As described hereinafter in more detail with reference to FIGS. 7A and 7B, the user computer 12 and the second computer 24 access the server 20 through the browsers 18, 28, respectively. The browsers 18, 28 are displayed on the user computer 12 and the second computer 24 via a display 14, 26, which is a cathode ray tube or a liquid crystal display, for example.

Once the user computer 12 accesses the server 20 utilizing the browser 18, the server 20 transmits to the user computer 12 a user applet 22. The user applet 22 is adapted to enable the user computer 12 to communicate through the network 16 with the server 20. A service applet 30 is disposed on the second computer 24 to enable the second computer 24 to communicate with the server 20. The service applet 30 can either be transmitted to the second computer 24 by the server 20 or be disposed thereon. After the user computer 12 receives the user applet 22, the second computer 24 is notified that a link is established, and that a session can be established between the user computer 12 and the second computer 24. When the session is established, users of the user computer 12 and the second computer 24 can visually communicate.

The users of the user computer 12 and the second computer 24 visually communicate by sharing content on their respective displays 14, 26. More particularly, the browser 18 displays a user interface containing a user view on the user computer 12, while the browser 28 displays a user interface on the second computer 24. When a session is enabled, the user interface of the second computer 24 contains a representation of the user view that is displayed on the user computer 12. Thus during a session, the user computer 12 and the second computer 24 are viewing a copy of the same user view on their respective browsers 18, 28. The user computer 12 and the second computer 24 are then viewing shared content.

During the session, either party can manipulate the shared content displayed on the party's computer. When the shared content is manipulated, the applet disposed on that party's computer will communicate to the server 20 through the network 16 that there has been a change to the shared content. In the preferred embodiment, the applets 22, 30 selectively poll the server 20 during a session to ascertain whether an event has occurred, such as a change in the shared content. This is facilitated by designating each session and each applet in the session with a unique identifier, as further described with reference to FIGS. 7A and 7B. When an applet polls the server 20 having the proper session identifier, the server 20 communicates to the applet that an event has occurred. That applet then communicates with the browser of its respective computer and causes the browser to display any changes in the shared content. Once the browser of the unchanged computer displays what was communicated to it by the server 20, both parties will again be looking at the same shared content on their respective browsers. This process continues back and forth such that either party may lead the other to view, for instance, another web page or a software demonstration, among other items hereinafter discussed.

In another implementation, the server 20, instead of the applet, can retrieve the changes to the shared content and then transmit the changes to the applets in the session. In this implementation, the server 20 acts as a proxy server, the function of a proxy server is well known in the art.

In the preferred embodiment, after a user of the second computer 24 elects to alter the shared content, the service applet 30 waits for a response from the server 20 before updating the shared content on the second computer. It waits for a response from the server 20 that it has communicated the user applet 22 and has changed the shared content on the user computer 12. Once the server 20 receives communication back from the user applet 22 that it has changed the shared content on the browser of the user computer 12, the server notifies the service applet 30 of the second computer 24. At this time, service applet 22 of the second computer 24 updates the representation of the shared content 52 of the second computer's interface. In this manner, the user interface of the second computer 24 will not get ahead of the user computer 12. It should also be noted that each computer 12, 24 are retrieving the shared content 52 independently and, in this instance, not sending the shared content 52 from one computer to another.

It should be obvious to those skilled in the art that the server 20 can inform the applets 22, 30 in each session of any changes without requiring the applets 22, 30 to poll the server 20 without departing from the scope of this invention. Further, the applets 22, 30 can work in conjunction with the server 30 such that any combination of polls or pushes results in the applets 22, 30 being notified that an event has occurred. Moreover, polling can be replaced with event driven technology, or similar notification technologies, as the event driven technology becomes more acceptable on the Internet.

In the preferred embodiment, the server 20 is a JAVA server utilizing JAVA objects. JAVA is a registered trademark of Sun Microsystems, Inc. The user applet 22 and the service applet 30 communicate with the objects disposed upon the server 20. In the preferred embodiment, the applets 34 are also JAVA applets. This enables the system 10 to be a cross-platform system and as such does not need any executable files previously disposed on the user computer 12 or any of the computers involved in the session. The JAVA server can run on a UNIX computer, a MACINTOSH computer, MS Windows computer, a Silicon Graphics computer, or any other well-known computers in the art. UNIX is a registered trademark of AT&T Corp. MACINTOSH is a registered trademark of Apple, Inc.

The user applet 22 performs event monitoring and communication as was described in part above. The user applet 22 also has a model controller view. The model controller view of the user applet 22 is the user view which is further described with reference to FIGS. 4A and 4B. The user applet 22 also shares much of the object model of the system 10, unlike a typical client. The user applet 22 having a portion of the object model allows the system 10 to function when it is fully distributed. This implementation makes it easy to replace the polling mechanism with distributed object communication technologies including, for example, Remote Method Invocation ("RMI") © Javascript, Sun, Common Object Request Broker Architecture ("CORBA"), Internet Inter-Orb Protocol ("IIOP") and Distributed Component Object Model ("DCOM"), © Microsoft. For example, the system 10 can manipulate an object on the user computer 12 and have the user computer 12 transmit through the user applet 22 to the server 20 a response, both while the user computer 12 is unaware that the communication or manipulation of the object has occurred. This implementation, among other things, enables the server 20 to extract from the user computer 12 attributes of the user computer 12 where the attributes can include items such as the user computer's e-mail address, the user computer's history of links on the network 16, and the user computer's specifications, among other items.

In the preferred embodiment, the user applet 22 is a persistent applet. The user applet 22 is loaded into a cache (not shown) of the user computer 12, preferably a local cache. It is persistent because once the user applet 22 is downloaded from the server 20, the user applet 22 remains on the user computer 12 as long as the user computer 12 remains in the session with the server 20, unless it gets removed from the local cache by the user computer 12 as is well known in the art. However, if it is not removed, the persistent applet will remain disposed on the user computer 12 such that it will not have to be downloaded again from the server 20. The user applet 22 will remain in the cache regardless of any changes to the user interface of the user computer 12.

The user applet 22 is selectively generated by the server 20 to enhance a resource collection function of the user computer 12 while enabling the user computer 12 to participate in the visual communication. To enhance the resource collection function of the user computer 12, the server 20 evaluates the functions of a resource, such as a spreadsheet application for example, that the user computer 12 requires at any given point in time. After the server 20 evaluates these functions, it then generates the user applet 22 representative of the functions. Once the server 20 generates the user applet 22 representative of these functions, it transmits the user applet 22 to the user computer 12, as previously described.

Typically, the functions represented in the user applet 22 are only a subset of the functionality of the resource. This is analogous to using EXCEL, a trademark of Microsoft Corp., spreadsheet and only getting the graphing feature when one tries to use it, for example. By only including a subset of the functionality as required by the user computer 12, the time for downloading between the server 20 and the user computer 12 is decreased. Further, the amount of storage space required in the user computer 12 is also decreased. Thus, the server 20 by selectively generating the user applet 22 enhances the resource collection function of the user computer 12. It should be obvious to those skilled in the art that the server 20 can, in real-time or pursuant to a timer, continually download to the user computer 12 any necessary functionality in an applet 22. The user computer 12 can also trigger the server 20 to inform it that it needs to be given an additional applet. In the system 10, the user computer 12 receives what it needs as it needs it. Thus, the user computer 12 is optimized as a very thin client in the thin client fat server model.

For example, if a user computer 12 enters a session to share a web page as further described hereinafter, the server 20 only downloads functionality to the user computer 12 necessary for the browser 18 to be notified about, and to display the web page. If, for example, the user computer 12 is sharing a software application, then the server 20 will download to the user computer 12 another applet in real time of the next piece of functionality the user computer 12 needs to implement the software application.

It should be obvious to those skilled in the art that the selective generation of an applet and subsequent downloading of that applet can be used for applications outside of the system 10 without departing from the scope of this invention.

Turning now to the service applet 30, the service applet 30 can comprise one or more applets each adapted to provide the second computer 24 with different functionality. The service applet 30 at minimum must provide the second computer 24 with the ability to communicate with the server 20. Again, the server 20 can download the service applet 30 in real time to the second computer 24 during the session. The service applet 30 shares much of the object model with the user applet 22, as previously described, to enable implementation of the system 10 in a distributed environment. One implementation uses a proprietary interface definition language to communicate session information between applets 22, 30 and the server 20 based on a polling model, while another is based on event notification. Thus, the service applet 30 and the user applet 22 enable the user computer 12 and the second computer 24 to bi-directionally communicate over the network 16.

The visual communication of system 10 is further enhanced by audio communication between the users of the user computer 12 and the second computer 24. In one implementation, the user computer 12 connects to the server 20, receives the user applet 22, and the service applet 30 is notified of a call request from the user computer 12. Upon notification of the request, the second computer 24 implements audio communication either through voice over network ("VON") applications or a traditional telephony system (not shown). At this point, the user computer 12 and the second computer 24 are in communication both audibly and visually.

Figure 2:
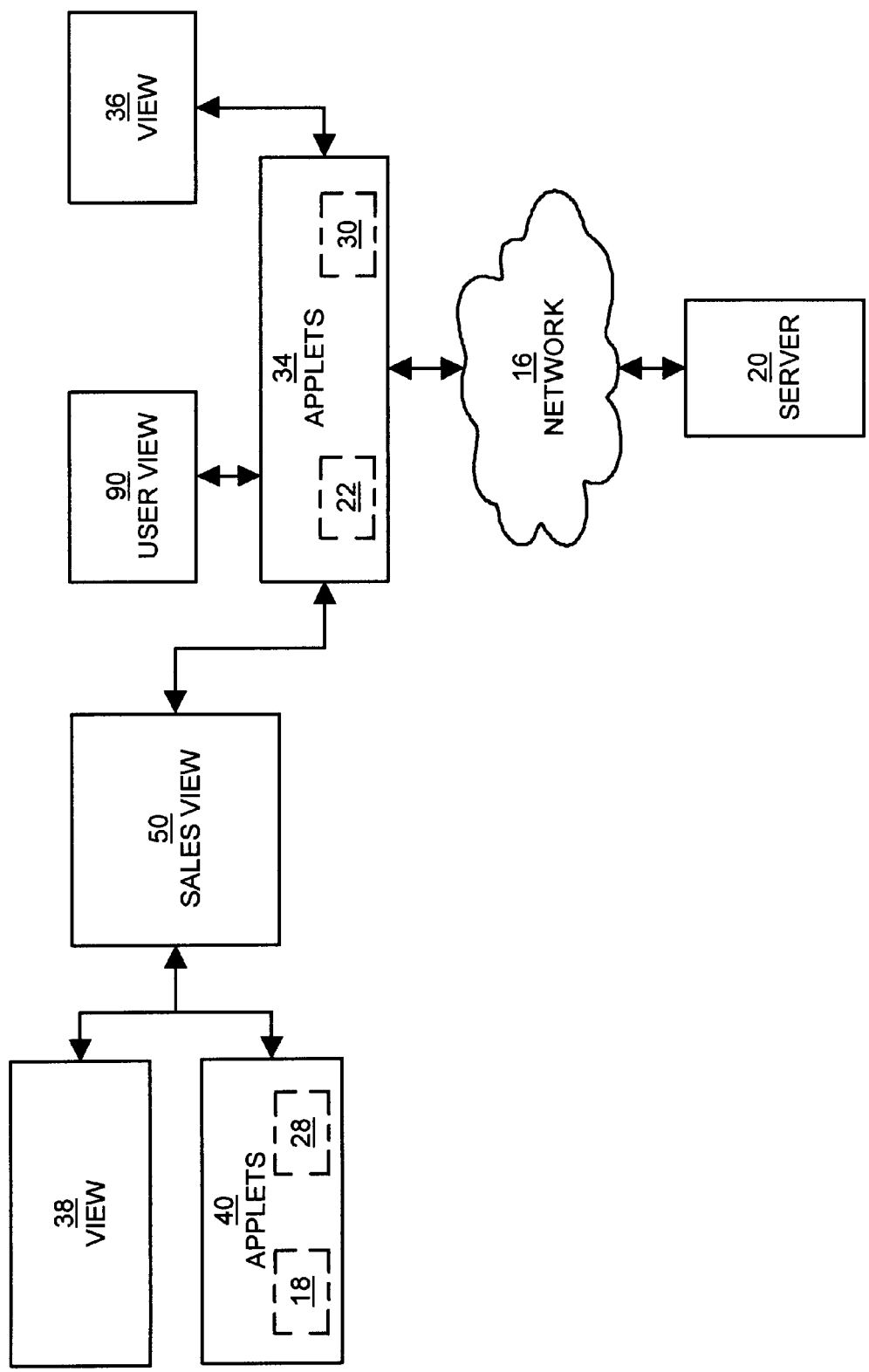
FIG. 2 shows a block diagram of the system of FIG. 1.

The visual communication can be further described with reference to FIG. 2, which shows a block diagram of the system of FIG. 1. As was previously described, the server 20 transmits through the network 16 applets 34. The applets include the user applet 22, the service applet 30, any other applet necessary to give the user computer 12 or the second computer 24 functionality.

The server 20 is capable of ascertaining, as hereinafter described, what type of computer is requesting a download of one of the applets 34. This is achieved by having participants, such as the user computer and the second computer, in a session use different sign-on pages and/or by analyzing an information payload sent by the browsers in an HTTP sign-on request. As such, if the server 20 identifies that the requester is the user computer 12 then it downloads the user applet 22 capable of generating a user view 90 and the functionality the user computer 12 requires as previously described. If, on the other hand, the server 20 ascertains that the requester is a sales representative, then it downloads a service applet 30 capable of generating a sales view 50. Similarly, if the server 20 ascertains that the requester is a system administrator, the server 20 downloads an applet capable of generating an administrator view 36.

The server 20 ascertains and validates which type of user is requesting one of the applets 34 by various methods. One such method allows the server 20 to validate each of the computers using a password system. In this implementation, any requester can get any view 36, 50, 90 as long as it has the appropriate validation codes such as a name and a password. Additionally, with the appropriate validation codes a requester can log-on from anywhere in the world that is connected to the network 16. Thus, others can join in a current session simply by knowing the validation codes.

In the preferred embodiment, the sales representative and the administrator have predetermined passwords stored in a database (not shown) communicating with the server 20. The database can be disposed on the server 20 or remotely therefrom. The server 20 communicates with the database through a database interface that uses Java Database Connectivity ("JDBC") or other Object Database Connectivity ("ODBC") equivalent database languages, for example. In the preferred embodiment the database is a relational database, although it can be an object database or other forms of data storage well known in the art.

As such, when a requester logs-on to the server 20, the server 20 checks the database to see whether the requester has a valid log-on and the associated applets 34 required by the requester. Once the server 20 validates the log-on, then as described, the server 20 will download one of the applets 34. In this way, the administrator can function as a sales representative having at one time a service applet 30 downloaded to it via the server 20 and at another time have an administrator applet downloaded to it via the server 20.

The user computer 12 communicates with the server 20 through a web page. The user computer 12 either requests a call through the web page or enters a password on the web page that was provided to the user computer by the sales representative, as described further with reference to FIGS. 7A and 7B. Thus, the server 20 can uniquely identify that a user computer 12 is requesting a user applet to generate the user view 90 by the method of communication with the server 20.

Each of the applets 34 allows the browser of the respective computer to generate the associated views 36, 50, 90. In a session, the shared content is displayed in the user view 90 of the user computer 12 by the browser 18, while the shared content is displayed on the second computer 24 within the sales view 50. The user interface of the second computer 24 or the sales view 50 contains a representation of the user view 90.

When the shared content in the user view 90 or the representation of the user view is manipulated by one party, through communication among the applets 34 and the server 20 the shared content of the other party's view will be updated. For example, suppose the sales view 50 contains an HTML file located at the URL source location www.webline.com. The user view 90 will also contain a copy of the HTML file with the URL source location www.webline.com. If the second computer 24 wishes to direct the user computer 12 to the service's page of the Webline Corporation located at www.webline_services.com, then the second computer 24 can change its sales view 90 such that the URL source location of the shared view is www.webline_services.com. Once the second computer 24 changes the sales view 50 by methods such as the script as described hereinafter, or just by typing in the URL source location, the URL source location of that page is then transmitted by the service applet 30 to the server 20. The server 20 then tells every other applet that is part of the session that there is a new URL source location. In this example, the server 20 will tell the user applet 22 that there is a new URL source location. After the user applet 22 receives information, it then causes the browser 18 of the user computer 12 to pull down a new page from the network 16 and display on the user view 90 a copy of the HTML file at www.webline_services.com. The shared content can include web pages, files, application images, advertisements, interactive forms data, or application data among any other form of data that can be captured and displayed on the browser.

In addition to the sales view 50 and user view 90, other views can also be implemented by the applet such as an administrative view 36, for example. The administrative view 36 displays information such as the structure of the sales force, reports, real-time monitoring of the communications, queue structure and status, which will be further described hereinafter, for example. It should obvious to one skilled in the art that the administration view 36, the sales view 50, and the customer view 90 can be disposed on one computer or more than one computer.

Further any computer displaying the views 50, 90, 36 require a particular operating system 38 to accept the applet and share content in the preferred embodiment. As such, they can be Windows-based, Macintosh-based, or UNIX-based, among others. Further, the browsers 40 can be any number of types, such as Netscape Navigator, Microsoft IE, Sun Hot Java, for example. Further, the browsers 18, 28 do not have to be the same on the user computer 12 and the second computer 24.

Figure 3:
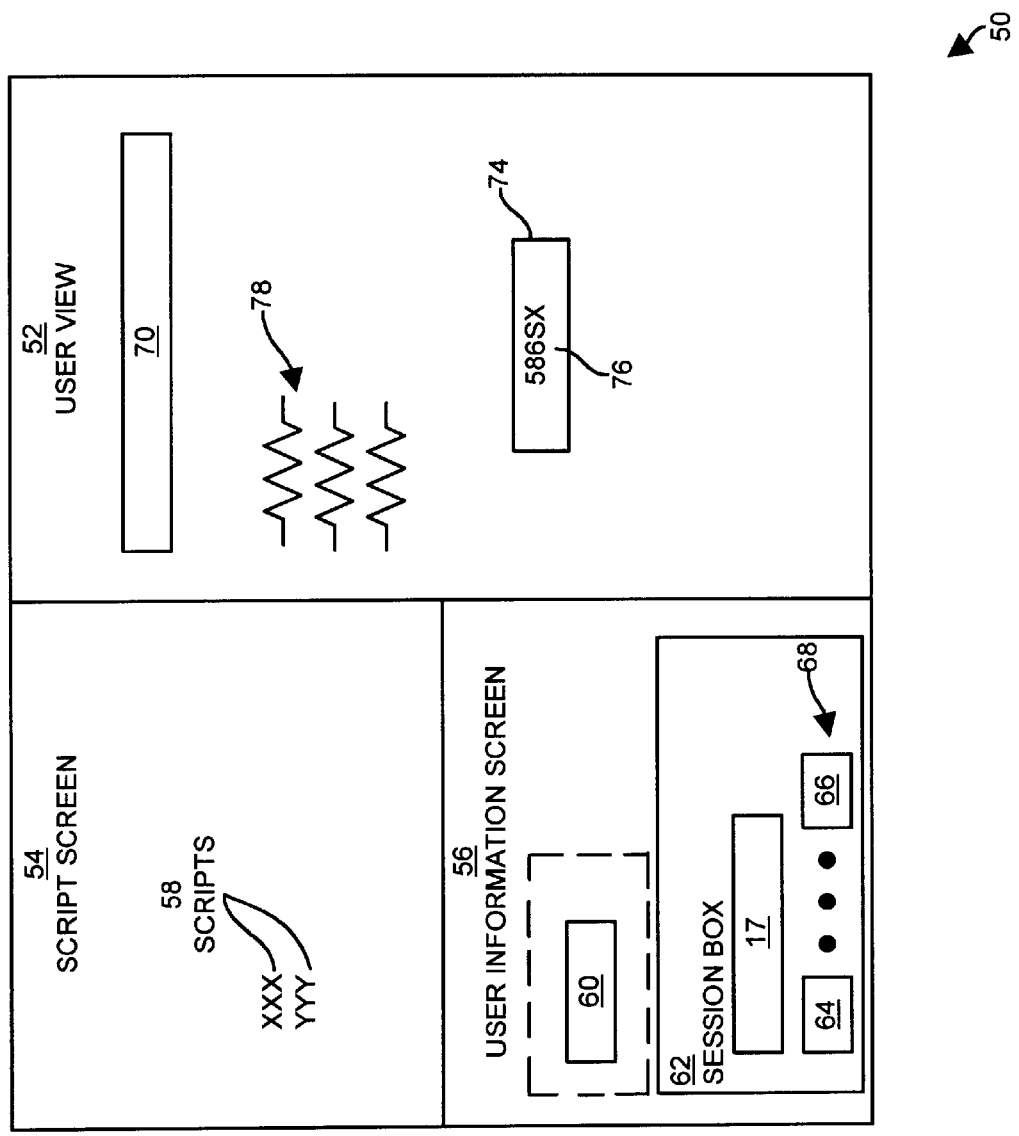
FIG. 3 shows a user interface in accordance with one embodiment of this invention.

Turning now to FIG. 3, which shows at least one user interface that in the preferred embodiment is the sales view 50. In addition to a representation of the user view 52 that contains the shared content, the user interface also contains a script screen 54.

The script screen 54 can display a plurality of scripts 58 or just one of the plurality scripts that is activated in the user interface. The second computer 24 can have predetermined scripts 58 illustrated on script screen 54 from which to choose, where each of the scripts 58 may be tailored to assist a particular type of user computer 12 or second computer 24. For example the scripts 58 could include: information regarding a company, a state of the market script, features of products, benefits, architecture or any set of information limited only by the imagination of the user. In the preferred embodiment, the scripts 58 are written in HTML so that the scripts 58 are displayed in the browser.

The scripts 58 dictate the shared content contained in the representation of the user view 52. The scripts 58 perform this function by having links that push the shared content into the representation of the user view 52, which, as previously described, is also pushed into the user view of the user computer 12. The scripts 58 perform this function by communicating with the service applet 30. As the service applet in the preferred embodiment is a Java applet, the script communicates with the service applet 30 using Javascript-to-Java communication in which a Javascript command can invoke a public method in a Java applet. It should be obvious to one skilled in the art that other embodiments are possible. Similarly, in another implementation the scripts 58 can communicate directly with the server 20, instead of the service applet 30.

The scripts 58 control what is displayed in a section of the browser adjacent to the scripts. As such, the scripts 58 update the browsers in a manner different than that is currently done for HTML files.

An example of a script in the preferred embodiment is as follows:

```
<html>
<head>
<title>Web.Dialog Sales Screen</title>
<head>
<body>
<font size=5 color=brown><b> Web.Dialog Sales Screen </b> </font>
<br>
<font size=2> <b> Web.Dialog version 1.0 Beta 1 </b> </font>
<hr>
<font size=4>
<ul>
<li><a
href=
   "javascript:top.salesrepFrame.d-
   ocument.SalesRepApplet.setAddress ('http://
   www.webline.com') ">Share www.webline.com
   </a></li>
<br><br>
<li><a
href=
   "javascript:top.salesrepFrame.d-
   ocument.SalesRepApplet.setAddress ('http://
   www.microsoft.com') ">Share www.microsoft.com
   </a></li.
<br><br>
<li><a
href=
   "javascript:top.salesrepFrame.d-
   ocument.SalesRepApplet.setAddress ('http://
   www.netscape.com') ">Share www.netscape.com
   </a></li>
</ul>
</font>
</body>
</html>
```

In this example, the script is an HTML Java script, which contains Javascript to communicate with the Java applet. The script is displayed in the top sales representative frame of the user interface, where the top sales representative frame is the script frame 54. In the code href= Javascript:top.salesrepFrame.document.SalesRepApplet.set Address, setAddress is a public method in the Java applet, which takes as an argument a URL source location, that instructs the applet to share the URL source location between all the participants in the session, being the user computer 12 and the second computer 24 in one embodiment. This particular script, if enabled by the second computer 24, will allow the second computer 24 push into the shared content the HTML file having a URL source location http://www.webline.com, http://www.microsoft.com or http://www.netscape.com.

For example, if the user of the second computer 24 wants to push http://www.webline.com into the shared content. In this example, the service applet 30 will receive from the script that the second computer 24 wants the shared content to display the file having the URL source location http://www.webline.com. The service applet 30 will then waits for a response from the server 20 that the server has verified that the user applet 22 has instructed the browser of the user computer 12 to download from the network 16 the file having the URL source location http://www.webline.com. Once the service applet 30 is notified that the server 20 has received the address of the shared content, the service applet 30 of the second computer 24 updates the representation of the shared content 52 of the second computer's interface, and the user applet 22 would receive the address of the shared content and update the shared content. The process would be repeated if the second computer 24 then selected to push the www.microsoft.com file into the shared content.

It should be obvious to those skilled in the art that scripts 58 can be used to push all the forms of shared content herein discussed to the user computer, including, scripts 58 that initiate a file transfer to download information to the user view from a remote location, for example.

As the scripts 58 are in HTML, users can easily write them. Scripts 58 can even be written interactively by allowing the user of the second computer 24 to insert the arguments from the script by simply going from one page to the next while having the script translate URL of that web page and insert it as an argument in its script. The scripts 58 can also be dynamically defined to push shared content according to attributes of the user computer 12 and/or attributes of the second computer 24. As such, the scripts 58 can be dynamically defined by the server 20 that access the attributes.

In addition, the second computer 24 can dynamically generate scripts during the session to meet any requirements of the session. For example, the second computer 24 can create a script to push the product comparison into the shared content in response to a request of the user computer 12 to see a product comparison. For instance, the second computer 24 can search for information regarding products, by keywords, URL source locations, for example. After selecting the information the second computer 24 wants to push into the shared content and thus the content of the script, the second computer 24 can activate the script so generated. This selection can be implemented by default or by allowing the second computer to click a generate script button or an accept button displayed in a session box 62, for example. Again, this would allow the user computer 12 to view the product comparison. Any comparison information can be displayed to the user computer 12 in this manner. Similarly, presentations regarding other information can be conducted by dynamically generating scripts and then pushing the shared content to the user computer 12.

Adjacent to the script screen 54 and disposed below it is a user information screen 56. The user information screen 56 contains queue information 60 and a session box 62. The session box 62 contains information about the session in which the second computer 24 is engaged in currently. The session information can include items, for example, duration of the session, address currently being displayed in the representation of the shared content 52, any password associated with the session, status of the session, ACD interaction information, customer information and control functions such as connect 64, hang-up 66, pause, new view, log-off, help, among others.

The session box 62 augments the scripts 58 by also providing a URL box 67. Instead of using a script link, the second computer 24 can insert any URL into the URL box 67, enable the connect 66 button, and push the shared content to the user computer as previously described.

The second computer 24 is also part of a queue of the server 20, and as such status of the queue information 60 is displayed on the user interface 50. The system 10 has at least one queue, where each queue contains one or more call requests from user computers. In the simplest implementation, when a user computer 12 links to the server 20, the server 20 places a call request from the user computer 12 in the queue in the order the server 20 received the request.

The call request can also be routed by the server 20 into queues based upon attributes of the user computer 12, where attributes of the user computer 12 can be an e-mail address, HTML pages that the user computer 12 was viewing when it made the call request or interests, or database entries for a user, for example. The server 20 selectively places a call request of the user computer 12 by parsing the attributes into one or more of the queues. For example, if the user attribute is that the last page the user computer 12 viewed advertised laptops, the server could route the call request to a queue for laptop computers. The service applet 30 would then poll the server 20, collect the queue information and thereafter display it on the user interface 50 if the second computer 24 was assigned to the laptop queue.

The assignments of the second computers are stored on the database disposed on the server 20, as well as information regarding the system, such as how long does it usually take for each call to be answered, for example. The database also contains information collected by the server 20 such as how many second computers are currently logged-on, how many second computers are in each queue, how many call requests are already in each queue, whether any second computers 24 are on breaks and how long or short breaks, and whether more than one second computer 24 should be signed off.

In one embodiment, the server 20 utilizes the database information and logic rules in association with the attributes of the user computer to route the calls to the queues. For instance, the server 20 could route a user computer to a secondary laptop queue, perhaps one with less experienced sales representatives, when the primary laptop queue had a predetermined number of call requests. In this example the server 20 could also download an administrative applet to the administrative view to update the queues information 60 displayed on that view, or the server could cause a beeper to ring, for example. The server 20 can also compare the attributes, such as name, against a database of customers, to enable priority customers to be routed accordingly.

The attributes could be collected from the user computer 12 using various methods. First, the user computer 12 could be prompted to enter the information directly, or by choosing from a drop down list of predefined attributes, such as novice user, experienced user, for example. In still another embodiment, the attributes can be extracted from the user computer 12

The service applet 30 retrieves the queue information to display using an interface language that includes commands, for example, such as, for example, tell me how many call requests are in the queue. It should be obvious to those skilled in the art that service applet 30 can implement polling or distributed object communication technologies without departing from the scope of this invention. The service applet 30 generates the queue information box 60, unlike the user applet 22.

A user computer 12 receives status regarding its position in the queue through the server 20, as well as receiving supplemental information, where the supplemental information can be analogized to MUSAK, a trademark of Musak, Inc. The supplemental information can be general information or specialized information displayed for the user computer 12. The server 20 ascertains which specialized information to display to the user computer 12 using the attribute information of the user computer 12. For example, if the attribute of the user computer 12 is laptops, the supplemental information displayed to the user computer 12 while in the queue can be advertisements, accessories or specifications laptops, for example, among other information that may be of interest to a user who wants to purchase a laptop. The server 20 implements displaying the supplemental information by communicating with the user applet 22.

After the session is established and the user is out of the queue, the user view 90 will display the shared content 52. In addition to the sharing a file as previously described, the user computer 12 and the second computer 24 can share a demonstration. To share a demonstration, either the user computer 12 or the second computer 24 must have the application capable of running the demonstration on the computer, in the preferred embodiment the second computer 24 has the application while the user computer 12 only has a browser. As the software demonstration runs, the second computer 24 captures an image of the demonstration, like a print screen, and transmits the captured image to the user applet 22. The captured image is saved as a jpeg, gif, bmp file or other graphical utility, transmitted to the server 20 or the user computer 12 and displayed on the user computer 12.

The user computer 12 and the second computer 24 can also share a form. The form has a URL source location 70 and a place to enter user information 74 and some text 78. In the preferred embodiment, the form can be any HTML page. The service applet 30 parses the form and stores each of the entries in the form as objects, such that the URL source location 70 will be an object, the text 78 would be an object and user information 74 would be an object, for example. In one implementation, the service applet 30 stores the objects as an array. In this example, it would be a two dimensional array of three objects. Either the objects that have been changed can be transmitted by service applet 30 to the server 20, or the array containing all the objects can be transmitted by the service applet 30 to the server 20, whereupon the user applet 22 would parse the array to ascertain which objects had changed.

If the sales representative had the user enter the text string 586SX into the user information 74 when the user was purchasing software for example, when the user hit enter, the user applet 30 would be informed that one of the objects of the form in its array had been changed, particularly that the array displaying the user information would now contain a text string. The user applet 30 would communicate this to the server 20 which would then let all the applets in the session, in this case the service applet 22. The service applet 22 would then evaluate each object in the array and ascertain which object had changed. After identifying that the user input 74 had changed to now include a text string 586SX it would update the shared content.

Figure 4A:
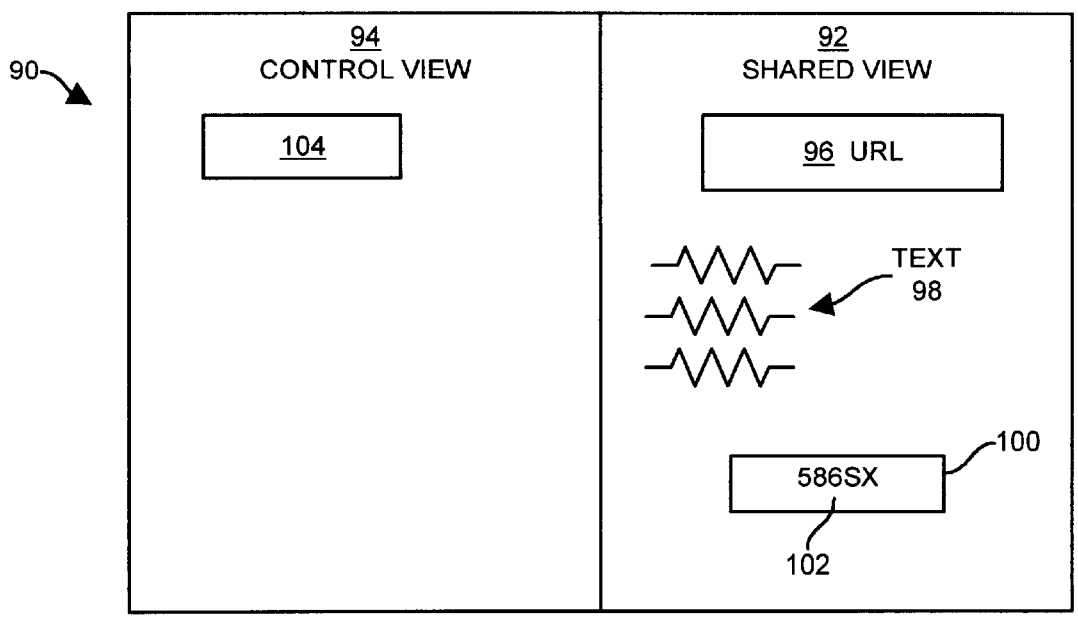
FIG. 4A shows a second user interface in accordance with one embodiment of this invention.

FIG. 4A shows the user view used in the previous example, where the user view 90 having the shared view 92. The shared view 92 is essentially a child browser spawned by the user applet 22 to display HTML files. The shared view 92 in this example has the URL 96, the text 98, the user information 100 and the text string 586SX 102. In this manner, either the user computer 12 or the second computer 24 can interactively enter information into the form that will be displayed to the other party in a real time as previously described. Thus, instead of having the second computer 24 merely push the appropriate form to the user computer 12, the user could complete the form while in the session and the sales representative could audibly communicate to the user whether the user was properly or improperly completing the form.

In the previous example, the applet was informed that there was an update of the object by either the user computer 12 or the second computer 24 hitting enter. This is not necessary for other entries on the form such as a check the box entry. For such entries, the user applet 22 could simply have two values, true and false represented by zeros and ones. Each time a check was formed in the box, the user applet 22 could inform the server 20 of the change in the object. The server 20 would then inform all of the applets in the session that there has been a change and appropriately update the representation of the shared content to include the check. As such, any of the forms on the Internet are capable of being completed in this manner.

In another embodiment, the form could also be a two dimensional array where in each frame of a form is the first argument, and the second argument is the objects on each form. In this embodiment, the first frame would be designated frame one, the second would be designated as frame two and the third designated as frame three.

In still another embodiment, the form could contain minor modifications that allow it to notify the service applet 30 or the user applet 22 when a change occurs in a field, similar to event monitoring. In still a further embodiment, applets can be generated to represent the objects of the form. In this embodiment the applets representative of the objects would notify the user applet 22 or the service applet 30, as the case may be of changes to the form. In the preferred implementation, the applets would be Java applets.

If the user computer 12 is attached to a server that disallows an outside server 20 to read information from a form, the user computer 12 can enable services such as data tainting in Netscape Navigator or other well known methods to enable the server to see the changes in the form. In data tainting, the user computer 12 explicitly gives permission to read the information from the document that the computer is viewing.

In addition to the shared view 92, the user interface 90 also has a control view 94, which is framed adjacent to the shared view 92. The control view 94 allows the user computer 12 to manipulate the session and can include features such as, for example, send 104, a box to type an URL location, as well as disconnect. The send 104 on the control view 94 can be selectively disabled by the second computer 24, to allow the second computer 24 to control the interactive visual session when a user computer 12 is manipulating the shared content improperly.

Figure 4B:
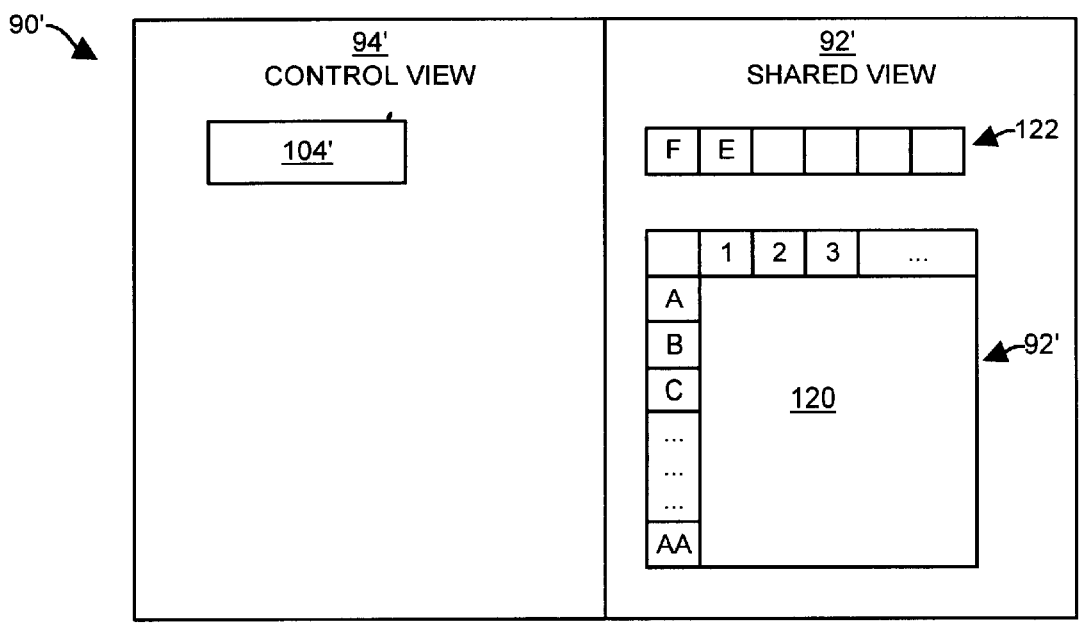
FIG. 4B shows a third user interface of another embodiment of this invention.

Turning now to FIG. 4B, where like numerals denote previously described elements, there is also shown a second embodiment of the user interface 90'. The user interface 90' that contains a control view 94' and a shared view 92', however, in this embodiment, the shared view overlies the control view and is not framed within the browser 18 of the user computer 12. This is the preferred embodiment as web pages are more commonly displayed as one page in a browser and not as frames so that each page can be individually book marked and printed as users are accustomed to. Further, as the user computer 12 does not have to see the control view it is not necessary to frame the web pages shown in FIG. 4A. In particular, as there is no queue information in user view regarding its queue once a session has established, the user computer does not need to have a framed page as shown in FIG. 3.

The shared view 92' of FIG. 4B, displays shared content of an application wherein the application displayed is a spread-sheet 120 having menu controls 122. To share an application, one of the computers in the session must have the application running on its computer. In the preferred embodiment the application is running on the second computer 24. If the user computer 12 is the one who wanted to share the page, they could select sharing the excel page by activating a button or press a hard key, for example, that states "Send to Webline". When either party hits the send button, an implementation grabs the screen as an image and then does an File Transfer Protocol ("FTP") or Hyper-text Transfer Protocol ("HTTP") to put it on a drive of the server 20. It should be obvious that there are other ways to implement application sharing that may be incorporated into the invention without deviating from the scope of the invention. In another embodiment, the shared application could be running on the server 20 or any server connected to the network 16, with the second computer 24 and the user computer 12 both sharing the same view of the application.

In the preferred embodiment a plug in for Netscape Navigator or an active X-control adapted for a Microsoft IE browser is used. In this embodiment, when the user hits the send button the Active X control grabs the screen image using Windows API functions or similar functions well known in the art. However, once the Java server receives the image, it notifies the applets in the session that it has received the image. The current image to be shared is given a random and unique URL location which is then sent to the other computer's applet across the network 16 just as if they were sharing a URL of a web page. The process is repeated for each image of the application that the parties want to share.

Image sharing can also be implemented by just transmitted the changes between one image and the next, and thus reserve resources on the server. Either way, the user computer 12 and the second computer 24 can share an application without requiring the user computer to be actively running the application.

In a further embodiment, any activity (e.g. key clicks, mouse clicks etc.) on the shared view of the application can be transmitted to the computer running the application and any resulting new changes can be shared.

Figure 5:
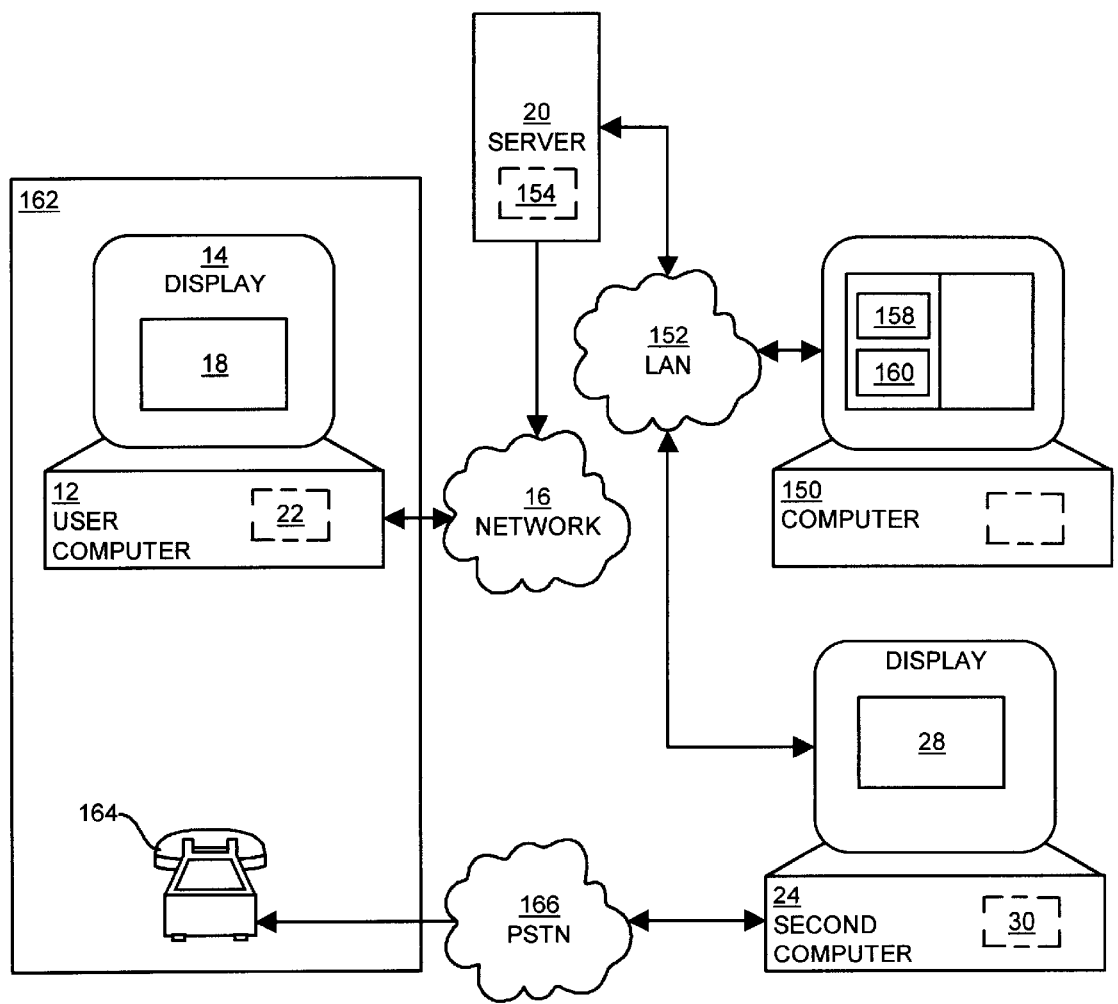
FIG. 5 shows a system diagram having more than one second computer in accordance with another embodiment of this invention.

Turning now to FIG. 5, where like numerals denote previously described elements, which shows one embodiment of the present invention wherein more than one second computer 24, 150 is connected to a LAN 152 which is then connected to the server 20. Computer 150 can be identical to the second computer 24 having an identical service applet 30 or it can be different. It can contain an administrative applet, for example.

This system allows the second computer 24 to have computer 150 join a session upon request by placing in a queue display 158 of computer 150 a request to join the session. When computer 150 activates the connect 160 feature in the queue display 158, the server 20 through the LAN 152 would download to the computer 150 the relevant session information as well as an applet, if necessary. It should be obvious to those skilled in the art that the second computer 24 can also transfer the session to computer 150 and not just add computer 150 to the session.

The server 20 is again connected to the network 16 for communication thereon, and the user computer 12 is connected to the network 16.

A phone 164 of the user is explicitly show connected to a public switched telephone network ("PSTN") 167. As such, the user 162 constitutes both the phone 64 and user computer 12. The second computer 24 also has a direct connection to the PSTN 167 either through a local exchange or a long distance service. As such, when the second computer 24 is informed by the server 20 that a call request from user 162 is in its queue, the second computer can connect through the public telephone network to the local PSTN 167 of the user 162 and to user's phone 164.

In this embodiment, the server has a database 154 disposed thereon. As previously described, the database stores information regarding the queue, assignments, attributes, and password validations among other items.

Figure 6:
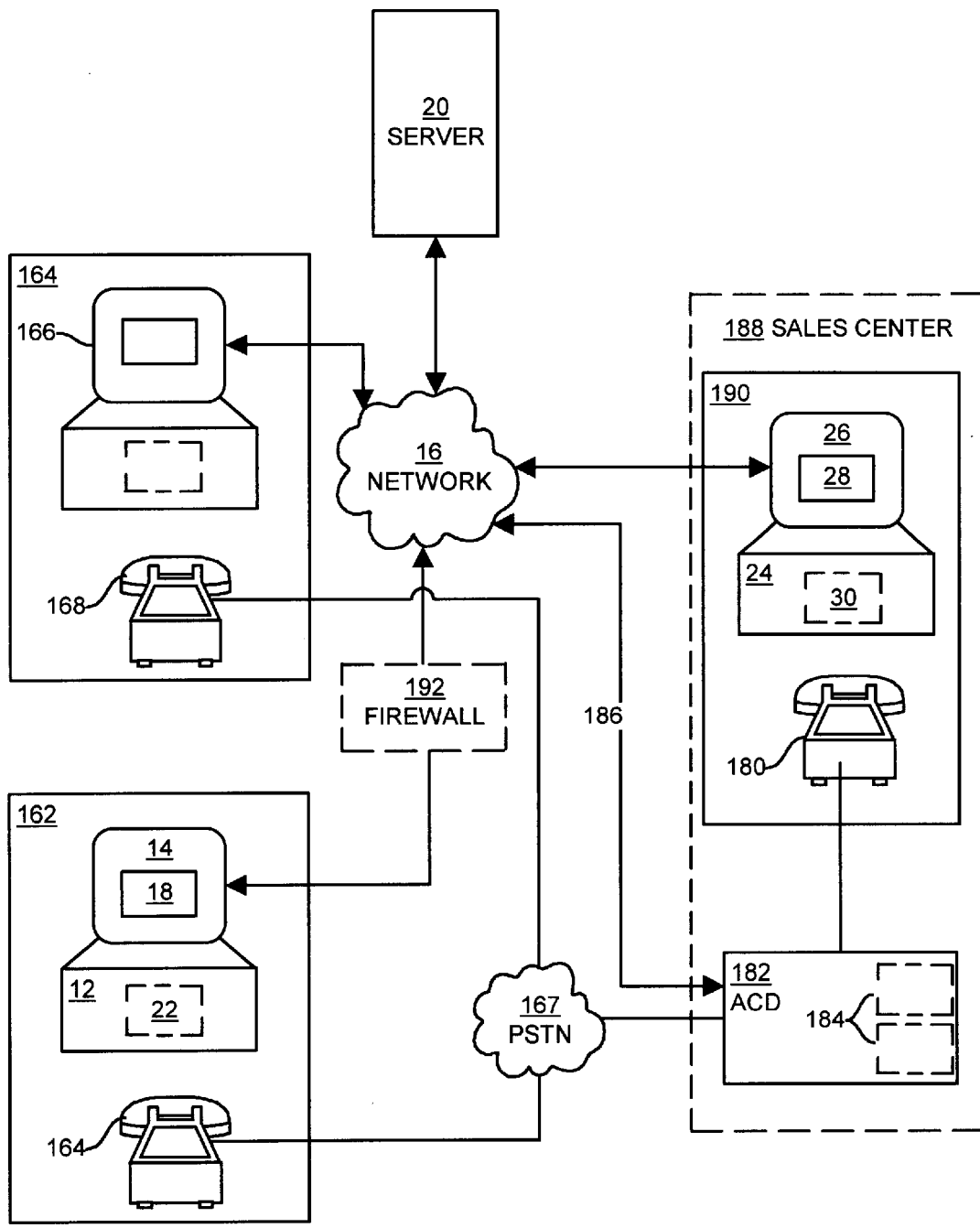
FIG. 6 shows a system diagram of yet another embodiment of this invention.

Turning now to FIG. 6, where like numerals denote previously described elements, which shows another embodiment of the present invention wherein more than one user 162, 164 is shown. User 162 has the user computer 12 and the phone 164 as was previously described. User 164 can also have a user computer 166 and a phone 168. Wherein both user computers 12, 166 are in communication with network 16 and both user phones 164, 168 are in communication with a PSTN 167. The second computer 24 can enter a call session with user computer 166 as well as enable the user computer 12 to enter the same call session.

In this embodiment, a sales center 188 is shown comprising the salesperson 190 having the second computer 24 and a phone 180. The phone 180, however, is connected to an automated call distribution system ("ACD") 182. ACDs are well known in the art, and they have, among other features, more than one queue 188 disposed thereon within which to route calls from the publicly switched network or data networks. In this embodiment, when user 162 enters a call request through the phone 164, the call is transmitted to the PSTN 166 and then to the ACD 184 which places it in a queue 188. The ACD could thereafter place the telephone call for the sales representative 190.

However, the ACD is also connected via 186 to the network 16. This enables either the queue information 188 of the ACD to be communicated to the server 20 and displayed by the server 20 to the more than one second computers in the sales center 188 and the user computer 12, 166. Alternatively, the call requests from the network 16 that go to the server 20 be communicated to the ACD. Having the ACD connected to the Internet in this manner, allows the system to use the sophisticated aspects of an automated ACDs, such as queue service, to supplement or substitute for the computer queue functions or other similar functions in the server 20.

In this embodiment, a firewall 192 is also disposed between the user computer 12 and the server 20. The firewall 192 can be configured so as to stop all incoming traffic from the network 16, stop all outgoing traffic from the user computer 12 or any variation there between. Typically, the firewall 192 will allow certain information to pass, but restrict the use of that information. For example, the firewall will allow applications in from the network 16, but once disposed the user computer 12 the application downloaded from the network 16 will not be allowed to function upon documents disposed on the user computer 12 that are not generated from the same server as was the application. Such a restriction disables the user applet 22 from modifying interactive forms within user computer 12.

The user computer 12 can expressly permit the function of the user applet 22 and the server 20 in each individual instance. In the preferred embodiment, however, the user applet 22 functions are achieved by talking through the firewall at port 80 using HTTP protocol. As it should be obvious to those skilled in the art, this port is usually left open by a firewall for communication over the worldwide web. It should be also obvious to those skilled in the art that other ports can be used with other modifications or any intermediary solution can be found wherein the user computer 12 grants permissions to the user applet 22 to perform functions.

In the preferred embodiment, however, the user computer 12 is typical allowed to connect to an external port of a random server as long as it is using HTTP protocol and as long as they are connecting to port 80 of another server. Using these specifications, the system performs HTTP tunneling. Accordingly, in the preferred embodiment the user applet 22 is sent from port 80 communicating in HTTP protocol to look very similar to a Common Gateway Interface ("CGI") request, and is allowed in by the firewall. Thereafter, communication from the user applet 22 still has to be in a protocol capable of going through the firewall. As such, any request from the user applet 22 in this embodiment looks like a standard HTTP request from a web page and as such looks like a CGI request. The firewall will let the request through from the user applet 22 onto the network 16. The request is in the form of a function caller request, which is transmitted as a message to a CGI handler. The CGI handler translates it, passes it to the CGI programmer which translates the CGI request to the server 20, which in the preferred embodiment is a Java server. Any transmission back from the Java server 20 to the user applet 22 is done through the same mechanism. Essentially, the communication between the server 20 and the user applet 22 is cloaked to look as is it is a request from a web site on the Internet and is such is allowed to go through the firewall 192.

It should be obvious to those skilled in the art that using either a different server or different handlers or other known methods to go through the firewall, including any port or other configuration. is possible without departing from the scope of this invention.

Figure 7A:
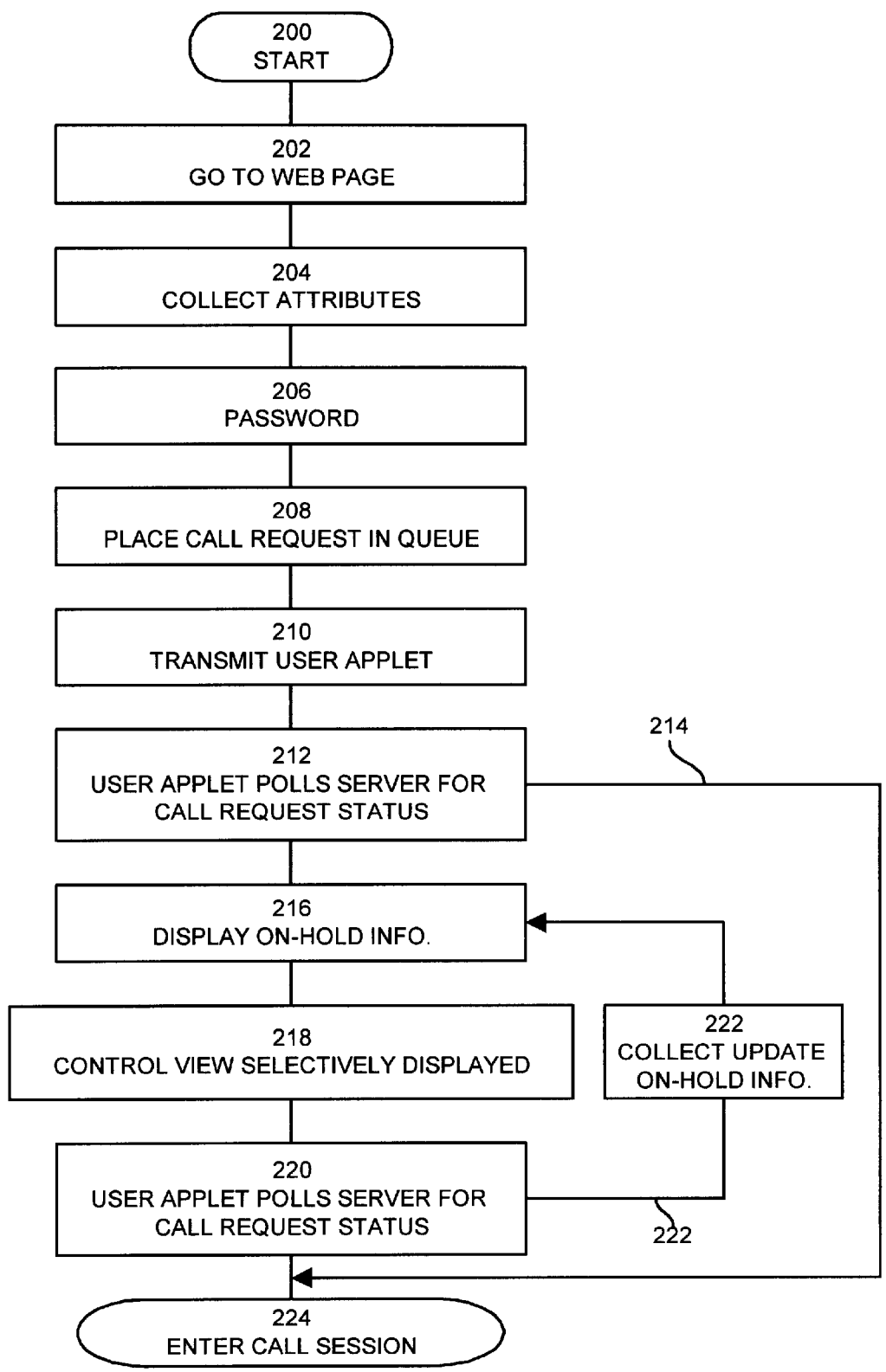
FIG. 7A shows a flow chart of one implementation of how a user computer enters a call session in accordance with this invention.

Turning now to FIG. 7A, which shows one method by which the user computer 12 can enter a call session with the second computer 24 and thereby providing audio communication across the network 16 or the telephone network in conjunction with visual communication across the network 16. As is previously described, the user computer 12 can enter into a call session with the second computer 24 by numerous methods.

In FIG. 7A the request to enter a call session starts 200 when a user of the user computer 12 is instructed by the sales representative of the second computer 24 via telephone to go to a specific web page 202. Displayed on that web page will be a sign-on page wherein the user is prompted to enter attributes, such as the users name or any other attributes previously described.

In this embodiment, as the user and the sales party are already in audio communication, the user will already have been provided by the sales representative a password that uniquely identifies to the server 20 the session the user computer 12 is supposed to enter. As such, the user computer 12 is also prompted to insert a password 206. After the user enters the password, the server 20 places the call request in computer queue 208 as was previously described.

At this point the server 20 also transmits to the user computer 12 a user applet 22. The user applet 22 generates a child browser in the user view of the user computer 12 and then begins to poll the server 20 for call request status 212. If the call request status is not simultaneously activated by the service applet 30, then the user computer 12 displays the on-hold information 216. The on-hold information will include, for example, the user computer's status in the computer queue, any advertisements as previously described, and other additional information as required.

The control view can also be selectively displayed by the user computer 218. However, in the preferred embodiment as the control view is not framed within the user interface. As such, the control view will be sitting under the child browser, and the child browser will display the on-hold information.

The user applet 22 will continue to poll the server 20 for the call request status 220. If the caller request status is that the user computer is still in the computer queue, the user applet 22 will update the computer queue information still in the computer queue 222, then the user applet 22 will collect the updated computer queue information 224 and redisplay the on-hold information in the child browser 216. If, however, the second computer 24 has selected the call request of the user computer 12, the service applet will notify the server 20 that the user computer having that session identifier can now be entered into a call session 224. After the parties are entered into the call session the communication between them and the manipulation of the shared constant on the user interface of the user computer 12 and the user interface of the second computer 24 will continue as previously described.

Figure 7B:
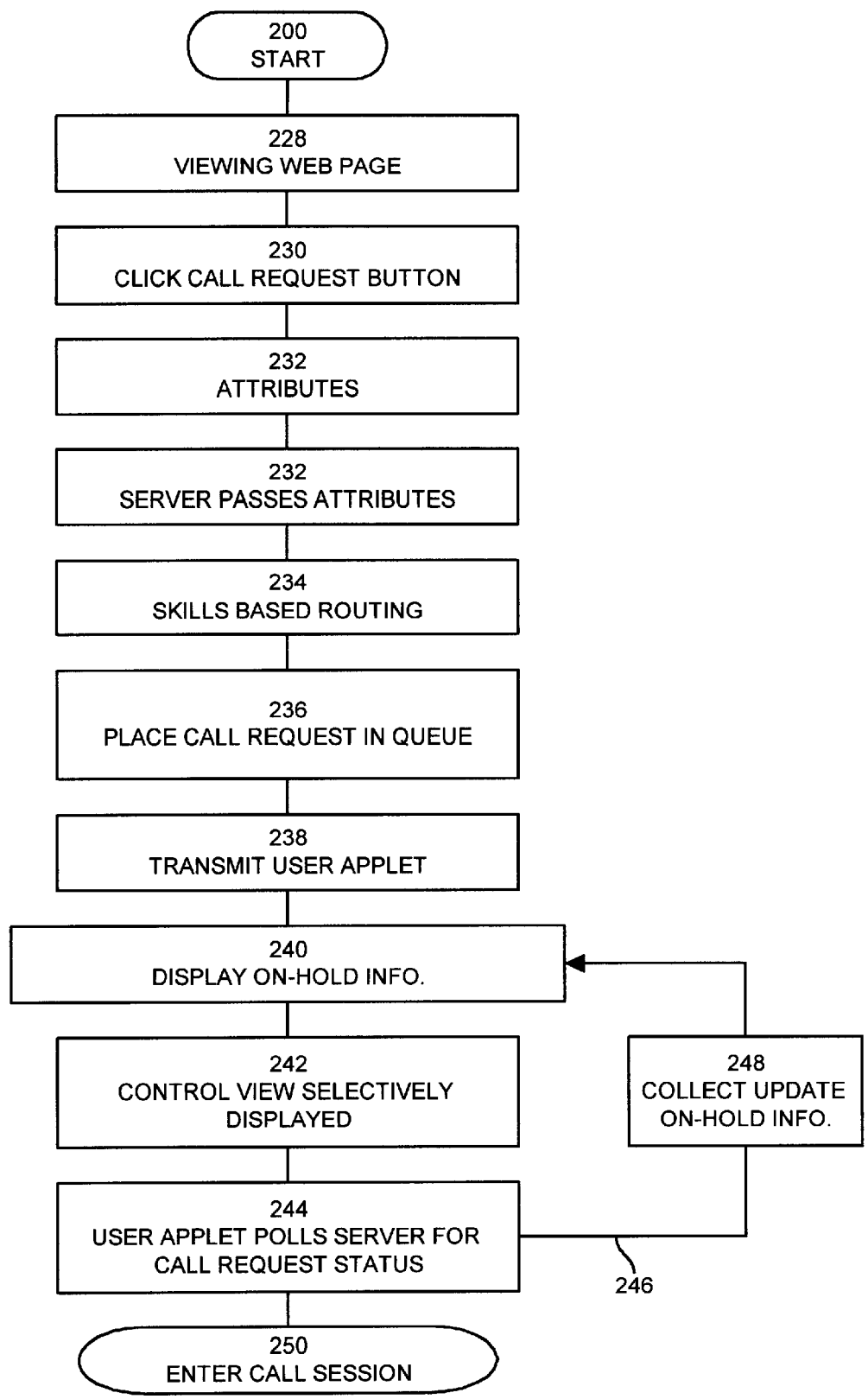
FIG. 7B is a flow chart of a second implementation of how a user computer enters a call session in accordance with an embodiment of this invention.

Turning now to FIG. 7B, which shows a second method by which the user computer 12 can enter a call session and start 200 the visual interaction between the user computer 12 and the second computer 24. In this method it is assumed that the user and the sales representative are not initially in audio communication. Instead, it is assumed that the user is on the worldwide web and is viewing the web page 228 of the sales organization.

If the user of the user computer 12 wishes to enter the session the user can click the call request button 230 on the web page of the sales organization. Upon clicking the call request button 230, the user computer 12 displays on its browser a form prompting the user to insert attributes 232 such as name, interest, and so on. After the user computer enters the attributes 232 the attributes are communicated through the network 16 to the server 20, whereupon the server 20 passes the attributes 232 via methods commonly known in the art. The server 20 then goes through skills based routing 234 as is previously described and determines which computer queue is appropriate for the call request.

The server 20 then places the call request in the computer queue 236. The call request in the computer queue can be communicated to the ACD or displayed on the computer queue of the second computer and the user computer. The ACD can also determine which queue is appropriate for the call request in place of the server and transmit the corresponding selection of the computer queue to the server.

Regardless, the server then transmits the user applet 238 to the user computer. The user applet spawns the child browser and displays the on-hold information 240 to the user. Again, the browser of the user computer 12 can selectively display the control view 242 in a framed method or behind the child browser. Similarly, the on-hold information can include not only information regarding the call request status in the queue but also the advertisements determined either based on the attributes or just the advertisements for the sales representatives' company in general, as is previously described. In one implementation if the ACD will place the call, the queue of the ACD would be displayed as communicated to the server, while in another implementation, the computer queue of the server would be displayed. It should be obvious that the queue of the ACD and the computer queue of the server can supplant each other or work in conjunction with each other as is necessary.

While the browser of the user computer 12 is displaying the on-hold information, the user applet 22 continues to poll the server 20 for the call request status 244. If the user applet 22 is informed by the server 20 that the call request is still on the queue 246 then the user applet 22 will collect the updated on-hold information 248 and redisplay the on-hold information in the child browser 240. This process will continue until the user applet 22 polls the server 20 for the call request status 244 and is told that the service applet has enabled the call request of the customer and informed the server 20 of the same. Alternatively, the ACD can place the call and inform the server that the call request has been enabled. At this time, the user applet receives notification that the user can enter the call session 250.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A method of providing visual interaction across a network between a remote user computer having a browser for reading files and a representative computer controlled by a representative, wherein a server is in communication with the user and representative computers, the method comprising:

establishing a link between the user computer and the server enabling communication between the user computer and the server;

the user computer generating a user view;

the representative computer enabling communication between the representative computer and the server;

the representative computer generating a service view that includes a representation of the user view by periodically polling the server to request a portion of shared data relating to the user view from the server;

the representative computer receiving inputs for changing the portion of shared data to alter the representation of the user view;

the representative computer detecting a change to the portion of shared data and transmitting the change in the representation of the user view within the portion of shared data from the representative computer to the server to change the portion of shared data on the server; and the user computer detecting the changes to the portion of shared data on the server and implementing the changes in the representation of the user view within the user view by periodically polling the server to request the portion of shared data related to the user view and obtaining the portion of shared data from the server to alter the user view to conform to the representation of the user view in the service view generated on the representative computer.

2. The method of claim 1, further comprising:

the user computer receiving inputs from a user for making changes in the user view;

communicating the changes to the user view; and transmitting the changes from the user computer to the representative computer through the server to change the portion of shared data relating to the user view on the server to allow the user computer to change the user view generated on the representative computer via the step of the representative computer generating a service view.

3. The method of claim 1, wherein the network is a TCP/IP network, and wherein the server provides to the first computer a page including a selectable object for requesting a telephone call.

4. The method of claim 1, further comprising displaying a script with simplified commands on the service view along with the user view, the script selectable by a representative operating the representative computer and operating to provide the inputs for changing the portion of shared data to alter the representation of the user view on the representative computer.

5. The method of claim 4, wherein the script is written in Hypertext Markup Language.

6. The method of claim 1, wherein the user and representative computers include respective user and service applets and that the service applet performs the steps of:

i) periodically polling the server to request a portion of shared data; and ii) detecting a change to a portion of shared data in the representation of the user view; and iii) transmitting the change to the shared data in the representation of the user view from the representative computer to the server in real-time to change the portion of shared data on the server, such that the user applet detects such a change to the portion of shared data and reflects such changes on the user view on the user computer in real-time to duplicate the changes made to the representation of the user view on the representative computer.

7. The method according to claim 1 wherein the user view and the representation of the user view include a form represented as an array of objects, the method further comprising:

selectively manipulating the objects included in the user view by the user computer;

selectively manipulating the objects included in the representation of the user view by the representative computer;

transmitting the objects between the user and representative computers through the server; and displaying the objects in the user view and the service view, thus allowing the user view and the service view to display the form including any changes caused by the steps of selectively manipulating the objects in the user view and selectively manipulating the objects in the representation of the user view.

8. A system for enabling communication comprising:

a user computer having a browser and a user applet;

a representative computer having browser and a service applet;

a server in communication with the user applet and browser in the user computer and the service applet and browser in the representative computer;

the user computer having a user view displayed in the browser on the user computer and the browser in the user computer capable of communicating with the server to generate the user view including a web page having content; and the service applet in the representative computer capable of periodically polling the server to obtain a copy of the web page having content to generate a service view in the browser on the representative computer that includes a representation of the user view including the web page having content as displayed in the browser on the user computer; and wherein the browser on the representative computer makes an alteration to the content in the web page in the service view to alter the representation of the user view; and wherein the service applet automatically detects and communicates the alteration to the content of the web page in real-time with the server such that the user applet on the user computer detects the alteration to the content of the web page as the alteration to the content is made in real-time on the server by periodically polling the server in real-time to obtain a copy of the alteration to the content of the web page from the server.

9. The system of claim 8, wherein the user computer, service computer, and server are connected over a TCP/IP network.

10. A method of providing communication between a remote user computer having a browser and a representative computer, with a server in communication with the user and representative computers, the method comprising:

establishing a link between the user computer and the server, the user computer capable of communicating with the server;

the user computer generating a user view;

the representative computer capable of communicating with the server;

the representative computer generating a service view that includes a representation of the user view;

the user computer receiving inputs for changing a portion of shared data displayed within a page displayed in the user view;

communicating changes to the portion of shared data displayed within the page displayed in the user view in response to the inputs;

detecting the changes to the portion of shared data displayed within a page in the user view and transmitting the changes to the portion of shared data displayed within a page in the user view from the user computer to the representative computer through the server; and the representative computer periodically polling the server to detect, on the server, the changes to the portion of shared data displayed within a page in the user view in real-time and implementing the changes to the portion of shared data to alter, in real-time, the representation of the user view in the service view on the representative computer to conform to the user view on the user computer as the changes are made to the portion of shared data displayed with the page displayed in the user view.

11. A method of communicating across a network between a user with a user computer having a browser and a representative computer, with a server in communication with the user and representative computers, the method comprising:

establishing a link between the user computer and the server, such that the user computer is capable of communicating with the server;

generating a user view on the user computer in response to receiving data from the server, the data including indicia for providing the user with a selectable callback option;

in response to the user selecting the callback option, the user computer transmitting a callback request over the network to the server;

the server storing the callback request in a queue associated with the server and transmitting a user applet to the user computer, the user applet causing the user computer to poll the server for a call request status indicating that a service applet operating on the representative computer has enabled the call request from the customer and has informed the server computer of enablement of the call request; and the representative computer displaying at least a portion of the queue, so that a representative operator of the representative computer can contact the user of the user computer to establish audio communication.

12. The method of claim 11, further comprising:

the user computer capable of communicating with the server;

the representative operator of the representative computer calling the user to establish audio communication;

the representative computer capable of communicating with the server;

the representative computer generating a service view that includes, based on shared data received from the server, a representation of the user view;

the representative computer receiving inputs from the representative operator for selectively manipulating the representation of the user view;

transmitting the changes in the representation of the user view from the representative computer to the user computer through the server; and the user computer implementing changes in the user view to alter the user view to conform to the representation of the user view in the service view, whereby the representative operator and user are in audio and visual communication.

13. The method of claim 11, wherein the queue includes automatic call distribution logic.

14. The method of claim 11, wherein the server transmits to the user view on-hold information before a callback call is made, the on-hold information indicating that the callback is being processed.

15. A system for communicating across a network comprising:

a user computer for use by a user and including a browser displaying a user view;

a representative computer at a call service center having a service view including a script frame displaying at least one script and a representation of the user view;

a server in communication with the user computer and representative computer;

the user computer capable of communicating with the server over the Internet and generating the user view on the user computer in response to data from the server;

the server, responsive to a request provided from the user, providing data including a selectable callback option;

the server having a queue for storing a callback request received from the user computer in response to user input requesting a callback; and the representative computer in communication with the server and displaying at least a portion of the queue in the service view and further displaying, in the service view, a representation of at least one script that is dynamically defined according to attributes of the user computer providing the callback request to the server, so that the operator of the representative computer can contact the user of the user computer to establish audio communication can manipulate the representation of the user view via selection of one of the at least one script.

16. The system of claim 15, further comprising:

the user computer capable of establishing a session with the server and generating a user view on the user computer;

the representative computer capable of communicating with the server and generating a service view on the representative computer, the service view including a representation of the user view;

the representative computer, responsive to inputs for selectively manipulating the representation of the user view at the representative computer, for communicating to the user computer the changes in the representation of the user view in response to the inputs; and the user computer implementing changes in the user view communicated from the representative computer to the user computer to alter the user view to conform to the representation of the user view in the service view.

17. A method of providing interaction across a network between a remote user computer having a browser for reading files a representative computer, and a server in communication with the user and representative computer, the method comprising:

the representative computer transmitting an array of objects representative of entries on a form to the server;

the server transmitting the array of objects to the user computer in response to receiving a periodic poll for the form from the user computer;

receiving, at the user computer, user inputs for making changes to entries on the form;

the user computer causing the changes made in the entries on the form, based on the user inputs, to be made to individual objects in the array of objects that correspond to such entries on the form; and the user computer communicating the array of objects to the server;

the server transmitting the array of objects containing the changes to the form to the representative computer in response to receiving, from the representative computer, a periodic poll for the form; and the representative computer altering the form displayed at the representative computer to conform to the changes entered by the user based on the individual objects in the array of objects that contain such changes.

18. The method of claim 17, wherein the objects are stored in a two dimensional array.

19. A method of operating a call server in conjunction with a web server on a computer network, the method comprising the steps of:

providing a user applet to a user computer from the web server;

receiving from the user applet a message requesting a call back to a user of the user computer, the message comprising contact information to allow a representative using a representative computer to contact the user of the user computer over the network and comprising information enabling remote control of the user computer;

initiating a voice conversation over the network using voice over network technology between the representative using an representative computer and the user using the user computer;

while maintaining the voice conversation, receiving, at the web server, shared data identifying a web page by having the representative using the representative computer load a specific web page into a web browser executing on the representative computer, and by having a service applet performing on the representative computer detect the specific web page and forward the shared data containing the identity of the specific web page to the server; and in response to receiving a periodic poll at the web server from the user applet to obtain shared data containing the identity of the specific web page, forwarding the shared data containing the identity of the specific web page from the web server to a user applet performing on the user computer;

receiving a request from a browser on the user computer to obtain the specific web page identified in the shared data such that the browser on the user computer displays, for viewing by the user, the specific web page navigated to by the representative on the representative computer of a web site displayed on both the user computer and the representative computer.

20. A method for providing multimedia communication between a user and an representative over a network comprising a user computer, a representative computer and a server, comprising the steps of:

receiving at the server a request for assistance from the user to the representative, the request transmitted over the network from the user computer to the server;

creating a voice communication connection between the user computer and the representative computer over the network in response to the step of receiving a request at the server;

establishing a voice conversation between the user and the representative using the voice communication connection;

creating a shared browser connection between a user network browser executing on the user computer and an representative network browser executing on the representative computer by providing a user applet to the user computer and a service applet to the representative computer; and providing interaction between the user network browser and the representative network browser using the shared browser connection while maintaining the voice conversation by:
  i) having the user applet detect changes to shared data within the user computer and forward the changes to the shared data to the server for detection by the service applet;
  ii) having the service applet detect changes to shared data within the representative computer and forward the changes to the shared data to the server for detection by the user applet; and by:
  i) having the user applet periodically roll the server to detect changes to the shared data in the server and in response to detecting such changes, causing the user network browser to contact the server to obtain the changes to the shared data; and
  ii) having the service applet periodically poll the server to detect changes to the shared data in the server and in response to such detection, causing the representative network browser to contact the server to obtain the changes to the shared data;
  such that the user applet and the service applet respectively cause the user network browser and representative network browser to reflect any changes made to shared data displayed therein on either the user computer or the representative computer.

21. A method as in claim 20, wherein the step of creating the voice communication connection comprises creating a voice-over-network connection over the network.

22. A method as in claim 21, further comprising the step of downloading an additional component to the user applet to the user computer to detect the presence of components associated with the user computer capable of supporting the voice-over-network connection and, if the user applet detects the components, enabling the voice communication connection using the voice-over-network connection.

23. A method as in claim 20, wherein the step of providing interaction comprises controlling the screen of the user network browser from the screen of the representative network browser via the user and service applets.

24. A method as in claim 23, wherein the step of providing interaction comprises loading web pages into the user network browser and navigating the web with the user under control of the representative making changes to the shared data in the representative network browser which are detected by the service applet.

25. A method as in claim 20, further comprising the step of creating at least one Hypertext Markup Language script capable of executing in the user network browser.

26. A method as in claim 20, wherein the step of providing interaction comprises downloading the at least one Hypertext Markup Language script to the user computer and executing the at least one Hypertext Markup Language script in the user network browser.

27. A method as in claim 20, wherein the step of receiving the request comprises receiving a callback request, storing the callback request in queue of stored callback requests at the server, displaying a portion of the queue on the representative computer to the representative, and the representative selecting one of the stored callback requests.

28. A call center system comprising:

a local area network including a coupling to an internet and a coupling to at least one representative computer;

a call server computer coupled to the local area network;

a call center coupled to the local area network and to the call server computer and coupled to a telephone network;

the call server computer receiving a message from a user using a user computer coupled to the internet the message requesting that a call center representative using the representative computer on the local area network call the user on the user computer, and in response thereto, the call server computer presenting a form to the user computer requesting customer information from the user, and the call server computer receiving, in response to the user submitting the form, the customer information;

the call server computer controlling the call center to cause a voice connection to be established between the user and the representative associated with the representative computer; and while maintaining the voice connection, the representative using the representative computer to forward specific changes to shared data content of a single web page to the call server computer and a user applet on the user computer periodically polling the call server computer to detect the specific changes to the shared data of the single web page as they are forwarded to the server and in the event of detecting the specific changes, causing a web browser on the user computer to obtain and display the specific changes to the shared data for the single web page as they appear on the server, therefore displaying in the browser on the user computer, for viewing by the user, the specific changes to the shared data to the single web page as they are occurring on the representative computer.

29. The system of claim 28, wherein the customer information received at the call server computer in response to the user submitting the form includes at least one of a telephone number and a name, and the call server computer using the customer information to maintain a list of internet customers waiting for representative access and to coordinate voice communication between the representative at the representative computer and the user at the user computer with a customer connection to a web site provided by a web server coupled to the local area network.

30. A method of providing visual interaction across a network between at least one user computer having a browser for reading files and at least one user computer and the at least one second computer, the method comprising the steps of:

establishing a link between the at least one user computer and the server;

selectively transmitting a user applet to the at least one user computer, the user applet enabling the at least one user computer to communicate with the server;

generating a user view on the at least one user computer;

communicating that the link is established to a service applet disposed in the at least one second computer, the service applet adapted to enable the at least one second computer to communicate with the server;

establishing a session between the at least one user computer and the at least one second computer;

enabling the at least one second computer to display a service view containing a representation of the user view;

selectively manipulating the representation of the user view by the at least one second computer;

communicating to the service applet changes in the representation of the user view;

transmitting the changes in the representation of the user view from the service applet to the user applet; and implementing any changes communicated to the user applet in the user view, thereby altering the user view to conform to the representation of the user view of the at least one second computer, thus enabling the at least one second computer to communicate to the at least one user computer;

wherein the service view further comprises a script frame adjacent to the representation of the user view and having a representation of one or more scripts disposed therein, each other one or more scripts being adapted to communicate with the service applet and being adapted to control the representation of the user view; and wherein the script is dynamically defined according to attributes of the at least one user computer.

31. A method according to claim 30 wherein the script is dynamically defined according to attributes of the at least one second computer.

32. A method according to claim 30 wherein the script is dynamically defined by the second computer to generate a comparison of information within a display.

33. A method according to claim 32 wherein the script is representative of a short-cut to enable the at least one second computer to push predetermined information to the at least one user computer.

34. A method of providing visual interaction across a network between at least one user computer having a browser for reading files and at least one user computer and the at least one second computer, the method comprising the steps of:

establishing a link between the at least one user computer and the server; selectively transmitting a user applet to the at least one user computer, the user applet enabling the at least one user computer to communicate with the server;

generating a user view on the at least one user computer;

communicating that the link is established to a service applet disposed in the at least one second computer, the service applet adapted to enable the at least one second computer to communicate with the server;

establishing a session between the at least one user computer and the at least one second computer;

enabling the at least one second computer to display a service view containing a representation of the user view;

selectively manipulating the representation of the user view by the at least one second computer;

communicating to the service applet changes in the representation of the user view;

transmitting the changes in the representation of the user view from the service applet to the user applet; and implementing any changes communicated to the user applet in the user view, thereby altering the user view to conform to the representation of the user view of the at least one second computer, thus enabling the at least one second computer to communicate to the at least one user computer; and wherein the user view and the representation of the user view is a form having objects; and wherein the method further comprises the steps of:

selectively manipulating the objects by the at least one user computer;

selectively manipulating the objects by the at least one second computer;

transmitting the objects to the service applet and the user applet; and displaying the objects in the representation of the user view and the user view thus allowing the userview and the service view to display the form as the form is completed; and wherein the step of transmitting the objects further comprises the steps of:

querying the form to ascertain the objects disposed on the form;

representing the form as an array having arguments representative of the objects;

selectively updating the objects such that the arguments of the array represent any changes to the objects; and transmitting at least portions of the array to the service applet and the user applet.

35. A method according to claim 34 wherein the at least portions of the array are representative of only the any changes to the objects.

* * * * *